(12) United States Patent
Polshettiwar et al.

(10) Patent No.: US 8,883,308 B2
(45) Date of Patent: Nov. 11, 2014

(54) HIGH SURFACE AREA FIBROUS SILICA NANOPARTICLES

(75) Inventors: Vivek Polshettiwar, Thuwal (SA); Jean-Marie Basset, Thuwal (SA)

(73) Assignee: King Abdullah University of Science and Technology, Thuwal (SA)

(*) Notice: Subject to any disclaimer, the term of this patent is extended or adjusted under 35 U.S.C. 154(b) by 89 days.

(21) Appl. No.: 13/038,789

(22) Filed: Mar. 2, 2011

(65) Prior Publication Data
US 2011/0253643 A1 Oct. 20, 2011

Related U.S. Application Data

(63) Continuation of application No. PCT/IB2010/002421, filed on Sep. 7, 2010.

(60) Provisional application No. 61/309,721, filed on Mar. 2, 2010.

(51) Int. Cl.
C07F 7/18 (2006.01)
C07F 17/00 (2006.01)
(Continued)

(52) U.S. Cl.
CPC ............ *C09C 1/3054* (2013.01); *C01P 2006/17* (2013.01); *Y02E 60/50* (2013.01); *B01J 23/28* (2013.01); *C01B 33/18* (2013.01); *C01P 2004/32* (2013.01); *B01J 23/22* (2013.01); *B01J 23/70* (2013.01); *H01M 4/921* (2013.01); *B01J 21/066* (2013.01); *C01P 2006/37* (2013.01); *C01P 2006/12* (2013.01); *B82Y 40/00* (2013.01); *B01J 35/006* (2013.01); *H01M 4/925* (2013.01); *B01J 35/023* (2013.01); *B01J 23/38* (2013.01); *B01J 35/06* (2013.01); *B01J 23/10* (2013.01); *C01P 2004/50* (2013.01); *B01J 23/14* (2013.01); *B01J 23/06* (2013.01); *B01J 21/063* (2013.01); *C01B 33/14* (2013.01); *C01P 2004/61* (2013.01); *C01P 2004/62* (2013.01); *B01J 37/0201* (2013.01); *B01J 23/02* (2013.01); *B82Y 30/00* (2013.01); *C01P 2004/10* (2013.01)
USPC .......................................... 428/402; 423/335

(58) Field of Classification Search
None
See application file for complete search history.

(56) References Cited

U.S. PATENT DOCUMENTS 7,572,424 B1 8/2009 Sokolov et al. ............... 423/339
7,592,039 B2 9/2009 Huang et al. .................. 427/181
(Continued)

FOREIGN PATENT DOCUMENTS

CN 100532460 C 8/2009
EP 1 464 618 10/2004
(Continued)

OTHER PUBLICATIONS

Che et al., "A novel anionic surfactant templating route for synthesizing mesoporous silica with unique structure," *Nature Materials*, 2:801-805, 2003.
(Continued)

*Primary Examiner* — Mark Ruthkosky
*Assistant Examiner* — Alexandre Ferre
(74) *Attorney, Agent, or Firm* — Fulbright & Jaworski LLP

(57) ABSTRACT

Disclosed are high surface area nanoparticles that have a fibrous morphology. The nanoparticles have a plurality of fibers, wherein each fiber is in contact with one other fiber and each fiber has a length of between about 1 nm and about 5000 nm. Also disclosed are applications of the nanoparticles of the present invention, and methods of fabrication of the nanoparticles of the present invention.

35 Claims, 19 Drawing Sheets

(51) Int. Cl.
| | |
|---|---|
| B01J 23/28 | (2006.01) |
| C01B 33/18 | (2006.01) |
| C09C 1/30 | (2006.01) |
| B01J 23/22 | (2006.01) |
| B01J 23/70 | (2006.01) |
| H01M 4/92 | (2006.01) |
| B82Y 40/00 | (2011.01) |
| B01J 35/00 | (2006.01) |
| B01J 35/02 | (2006.01) |
| B01J 23/38 | (2006.01) |
| B01J 35/06 | (2006.01) |
| B01J 23/10 | (2006.01) |
| B01J 23/14 | (2006.01) |
| B01J 23/06 | (2006.01) |
| C01B 33/14 | (2006.01) |
| B01J 23/02 | (2006.01) |
| B82Y 30/00 | (2011.01) |
| B01J 21/06 | (2006.01) |
| B01J 37/02 | (2006.01) |

(56) References Cited

U.S. PATENT DOCUMENTS

| | | | |
|---|---|---|---|
| 2006/0024503 A1 | 2/2006 | Wong et al. | 428/408 |
| 2007/0197708 A1* | 8/2007 | Jin et al. | 524/439 |
| 2008/0206562 A1* | 8/2008 | Stucky et al. | 428/403 |

FOREIGN PATENT DOCUMENTS

| | | |
|---|---|---|
| WO | WO 94/25268 | 11/1994 |
| WO | WO 2005/049625 | 6/2005 |
| WO | WO 2006/025462 | 3/2006 |
| WO | WO 2009/070380 | 6/2009 |

OTHER PUBLICATIONS

Coperet et al., "Homogeneous and heterogeneous catalysis: briding the gap through surface organometallic chemistry," *Angew. Chem. Int. Ed.*, 42(2):156-181, 2003.

Corma and Garcia, "Crossing the borders between homogeneous and heterogeneous catalysis: Developing recoverable and reusable catalytic systems," *Top. Catal.*, 48:8-31, 2008.

Davis et al., "Ordered porous materials for emerging applications," *Nature*, 417:813-821, 2002.

Gellman, "Nanocatalysis: More than speed," *Nature Mater.*, 8(2):87-88, 2009.

Gole et al., "Silica-based nanospheres, nanowires, nanosubstrates, nanotubes, and nanofiber arrays," *Colliod. Polym. Sci.*, 281:673-685, 2003.

Huo et al., "Generalized synthesis of periodic surfactant/inorganic composite materials," *Nature*, 368:317-321, 1994.

Iijima et al., "Nano-aggregates of single-walled graphitic carbon nano-horns," *Chemical Physics Letters*, 309:165-170, 1999.

Ingaki et al., "Synthesis of highly ordered mesoporous materials from a layered polysilicate," *J. Chem. Soc. Chem. Commun.*, pp. 680-682, 1993.

Joo et al., "Thermally stable Pt/mesoporous silica core-shell nanocatalysts for high-temperature reactions," *Nature Mater.*, 8(2):126-131, 2009.

Kresge et al., "Ordered mesoporous molecular sieves synthesized by a liquid-crystal template mechanism," *Nature*, 359:710-712, 1992.

PCT International Search Report and Written Opinion issued in International application No. PCT/IB2010/002421, dated Aug. 9, 2011.

PCT Invitation to Pay Additional Fees, issued in International application No. PCT/IB2010/002421, dated May 13, 2011.

Polshettiwar et al., "Self-assembly of metal oxides into three-dimensional nanostructures: synthesis and application in catalysis," *ACS Nano*, 3(3):728-736, 2009.

Reetz, "Size-selective Synthesis of Nanostructured Metal and Metal Oxide Colloids and Their Use as Catalysts," In: *Nanoparticles and Catalysis*, Ed D. Astruc, Wiley-VCH Verlag GmbH & Co. KGaA, Weinheim, Germany. doi: 10.1002/9783527621323.ch8. 2008.

Schlogl and Hamid, "Nanocatalysis: mature science revisited or something really new?," *Agnew. Chem. Int. Ed.*, 43(13):1628-1637, 2004.

Weckhuysen, "Heterogeneous catalysis: Catch me if you can!," *Nature Chem.*, 1(9):690-691, 2009.

Xia et al., "Monodispered colloidal spheres: old materials with new applications," *Adv. Mater.*, 12(10):693-713, 2000.

Xue et al., "Rearrangement of the aggregation of the gelator during sol-gel transcription of a dimeric cholesterol-based viologen derivative into fibrous silica," *Chem. Mater.*, 16:3702-3707, 2004.

Zhao et al., "Triblock copolymer syntheses of mesoporous silica with periodic 50 to 300 angstrom pores," *Science*, 279(5350):548-552, 1998.

Jin, Ren-Hua; Colloidal Crystalline Polymer Generated in situ from Growing Star Poly(oxazolines); J. Mater. Chem, 2003; 13: 672-675.

Dykes, Graham M., Dendrimers: a reivew of their appeal and applications; Society of Chemical Industry; J. Chem. Technol Biotechnol; 76: 903-918, 2001.

Office Communication in Chinese Patent Application No. 201080065156.8 / Serial No. 2013122001173250 dated Dec. 25, 2013.

Li, et al., Chinese J of Materials Res. 2(20):181-85, 2006. (Chinese, cited parts translated to English).

Office Communication in Russian Application No. 2012141952 dated May 7, 2014.

Office Communication in Cooperation Council for the Arab States of the Gulf Application No. GC 2010-16282 dated May 11, 2014.

Pengchong, et al., "Rearrangement of the Aggregation of the Gelator during Sol-Gel Transcription of a Dimeric Cholesterol-Based Viologen Derivative into Fibrous Silica." Chem Mater. 16, 2004.

* cited by examiner

HIGH SURFACE AREA FIBROUS SILICA NANOPARTICLES

CROSS-REFERENCE TO RELATED APPLICATIONS

This application claims priority to U.S. Provisional Application No. 61/309,721 filed Mar. 2, 2010, and International Application No. PCT/IB2010/002421 filed Sep. 7, 2010. The entire text of each of the above-referenced disclosures is specifically incorporated by reference herein without disclaimer.

BACKGROUND OF THE INVENTION

1. Field of the Invention

The present invention generally relates to the field of high surface area nanoparticles and applications thereof.

2. Description of Related Art

Nanotechnology has generated a great impact on materials, microelectronics, computing, pharmaceuticals, medicinal, environmental, energy and the chemical industries. Nanoparticles have long been recognized as having enhanced chemical and physical properties compared with their bulk forms. They can be applied as building blocks for fabrication of an assortment of valuable materials (Xia et al., 2000). They can be of various sizes, crystallinity, morphology, and chemical compositions. Nanoparticles can be composed of a variety of materials, with silica being one of the best known examples (see, e.g., Gole et al., 2003). The need for silica nanoparticles, particularly nanospheres with specific dimensions and morphology has grown because of the numerous industrial applications.

The field of silica nanospheres has expanded, particularly after the emergence of Stober's innovative method for the synthesis of monodisperse silica by hydrolyzing tetraethylorthosilicate (TEOS) (Stober et al., 1968). Following the inception of template-directed synthesis of mesoporous silica (Kresge et al., 1992), there has been a great deal of interest in controlling the morphology and pore size of nanospheres (Huo et al., 1994; Tanev and Pinnavaia, 1995; Zhao et al., 1998; Carlsson et al., 1999). Using template techniques, a variety of mesoporous as well as nano-silica materials with a wide range of morphology were synthesized (see, e.g., Cha et al., 2000; Sakamoto et al., 2000; Lu et al., 2001; Finnefrock et al., 2001; Yu et al., 2002; Che et al., 2003; Che et al., 2004; Yokoi et al., 2006; Gao et al., 2006; Bao et al., 2007; Han et al., 2009; Suzuki et al., 2009; Meng et al., 2009; Suzuki et al., 2010). These materials have found a wide application in catalysis (Davis et al., 2002; Corma and Garcia, 2008; Weckhuysen, 2009).

The effectiveness of nanoparticles in catalysis is primarily due to their microstructure, which allows good dispersion of active catalytic molecules on the large internal surfaces and pores. However, difficulty with sintering of active metals due to limited accessibility of active sites inside some pores has limited the applicability of nanoparticles in catalysis, particularly in instances where significant mass transport is essential and high surface area of nanoparticles can be potentially used as an alternative (Gellman, 2009; Joo et al., 2009; Schlögl and Hamid, 2004; Reetz, 2008).

Thus, there is the need for nanoparticles with a high surface area. Such nanoparticles would result in improved activity and stability of catalytic molecules, and would find application in other areas where a high surface area is desirable.

SUMMARY OF THE INVENTION

The present invention is related to the identification of a new family of well-ordered nanoparticles with a particularly high surface area. The high surface area is due to the fibrous morphology of the nanoparticles. The nanoparticles show excellent physical properties, including a high surface area, which renders them feasible for catalyst support, and a fibrous surface morphology, which makes it possible to obtain a high concentration of highly dispersed and easily accessible moieties on the surface of the nanoparticle. The nanoparticles of the present invention also possess a high thermal stability and a high mechanical stability, rendering them suitable for a wide variety of applications in industry.

The present invention generally includes nanoparticles that have a plurality of fibers, wherein each fiber is in contact with at least one other fiber. The term "nanoparticle" as used herein refers to a particle having a maximum diameter of between 1 and 5000 nm. In a particular embodiment, the nanoparticle is in the form of a dendrimer. "Plurality" as used herein refers to three or more. A "fiber" as used herein refers to a slender, threadlike structure that includes a length and a maximal thickness. Thickness can vary along the length of the fiber or it can be uniform along the length of the fiber. Different fibers can be of variable thickness or can be of uniform thickness. Similarly, fibers can be of variable length or can be of uniform length. In some embodiments, fibers are of varying lengths and varying thicknesses. In other embodiments, the fibers of a single nanoparticle are of uniform thickness and length.

In particular embodiments of the present invention, the nanoparticle includes silica (silicon dioxide), titania, alumina, ceria, zerconia, or a mixture thereof.

The fibers of a single nanoparticle may be of a length between about 1, 10, 50, 100, 500, or 1000 nm and about 2000, 2500, 3000, 3500, 4000, or 5000 nm, including all values and ranges there between. In particular embodiments, each fiber has a length of between about 1, 10, 50, 100, or 500 nm and about 500, 600, 700, 800, 900 or 1000 nm, including all values and ranges there between. In more particular embodiments, each fiber has a length of between about 1 nm and about 500 nm. The maximum thickness of a particular fiber can range from about 1 nm to about 100 nm. In more particular embodiments, the maximum thickness of a particular fiber ranges from about 1 nm to about 50 nm from about 1 nm to about 10 nm, or from about 4 nm to about 10 nm. In some embodiments, each fiber has a length of between about 1 nm and about 1000 nm and a thickness of between about 1 nm and about 50 nm. In further embodiments, each fiber of a single nanoparticle has a length of between about 1 nm and about 250 nm, and a thickness of between about 1 nm and about 10 nm.

The number of fibers of a nanoparticle can vary. In some embodiments, the nanoparticle includes at least about 100 fibers, at least about 1000 fibers, at least about 10,000 fibers, at least about 100,000 fibers, or at least about 1,000,000 fibers or more, or any range of number of fibers derivable therein.

In some embodiments, the nanoparticle has a configuration that is substantially spherical (herein referred to as a "nanosphere"). In such embodiments, the nanoparticle includes fibers that are substantially radially oriented within the nanosphere (i.e., converging to a central region of the nanoparticle). In such embodiments, the length of a fiber is the distance from the peripheral end of the fiber to the point the fiber attaches to another nanofiber in the central region of the nanosphere and is thus approximately equal to the radius of the nanosphere. In particular embodiments, the nanoparticle is a nanosphere comprised of silica that includes at least 100 fibers, where each fiber has a length of between about 1 nm and about 250 nm and each fiber has a thickness of between about 1 nm and about 10 nm.

In particular embodiments, as discussed above, the fibers are composed of silica. In further embodiments, the silica fibers include one or more attached ligands. A "ligand" as used herein refers to an ion, a molecule, a compound, a macromolecule, or a molecular group that is in contact with the fiber. The contact may be direct contact, such as through a covalent bond or an ionic bond. For example, the ligand may be covalently attached to an oxygen atom of silica. Alternatively, the contact may be indirect, such as through an intervening molecule, such as a linker. The ligand may be attached by simple absorportion or adsorption. In certain aspects, an intervening molecule is in contact with the ligand and the fiber. Non-limiting examples of linkers include an alkyl, a hydride, a carbene, a carbyne, a cyclopentadienyl, an alkoxide, an amido, or an imido group. The contact may be by simple absorption or adsorption of moieties onto the fibrous surface, admixed into the substance of the fibers, or inside the fibrous surface.

Non-limiting examples of ligands include a catalyst (e.g., metal catalytic molecules or any catalysts known in the art), drugs, and organic molecules. "Metal catalytic molecule" as used herein refers to a metal ion, a metal oxide, any of various organometallic complexes or any molecule to which a metal ion or metal oxide is bound. Non-limiting examples of metals include Au, Pt, Pd, Ag, Ni, Ru, Rh, Ir, Os, Co, Mo, W, Re, Mn, In, Ga, Cd, Cr, Zr, Ta, Fe and Cu. Non-limiting examples of metal oxides include various metal oxides of the above metals, $Al_2O_3$, $TiO_2$, $Fe_2O_3$, $CeO_2$, CuO, ZnO, $SiO_2$, $V_2O_5$, MgO, $La_2O_3$, $ZrO_2$, $SnO_2$, $MnO_2$, MoO3, $Mo_2O_5$ and zeolites. In some embodiments, the ligand is a drug. A "drug" as used herein refers to a chemical substance that is used in the diagnosis, treatment, or prevention of a disease or other condition in a subject. The term "drug" includes components of medications, imaging agents, and the like. In certain aspects, medications comprise therapeutic agents. Examples of therapeutic agents include an antimicrobial agent, an anti-inflammatory agent, a chemotherapeutic agent, a hormone, an analgesic, or a therapeutic nucleic acid.

In some embodiments, the nanoparticle has a maximum diameter of between about 20, 30, 40, 50, 60, 70.80, 90, 100, 200, 300, 400, or 500 nm and about 1000, 1500, 2000, 25000, 3000, 3500, 4000, 4500 or 5000 nm, including all values and ranges there between. In further embodiments, the nanoparticle has a maximum diameter of between about 100 nm and about 750 nm. In still further embodiments, the nanoparticle has a maximum diameter of between about 250 nm and about 500 nm.

In particular embodiments, the nanoparticle is a nanosphere comprised of a plurality of fibers having a maximal thickness of between about 1 nm to about 10 nm and a length of between about 25 nm to about 250 nm, wherein the nanoparticle is composed of silica and has a diameter of between about 50 nm and about 500 nm. In a more particular embodiment, the nanosphere has a diameter of between about 250 nm to about 450 nm.

Other embodiments of the present invention concern compositions that include any of the aforementioned nanoparticles. The composition may further comprise a pharmaceutically suitable carrier. The composition may be a solution. The solution may include a solvent, such as an aqueous solvent, an organic solvent, or a mixture of an organic solvent and an aqueous solvent.

Further embodiments of the present invention concern composites that include any of the aforementioned nanoparticles (herein referred to as "nanocomposites"). The composites may be fabricated using any method known to those of ordinary skill in the art.

Catalysts compositions comprising any of the aforementioned nanoparticles of the present invention are also contemplated herein. The nanoparticle may include an attached metal or metal oxide as discussed above. The nanoparticles of the present invention provide for a large surface area, which allows a large area of contact between a reaction mixture and a metal or metal oxide, given the fibrous configuration of the present nanoparticles. Also disclosed are methods of delivering a catalyst to a reaction mixture, involving contacting any of the aforementioned nanoparticles with a reaction mixture, wherein catalysis occurs.

Also disclosed are methods for producing a nanoparticle of the present invention, involving the steps of: (a) preparing a composition comprising a silica precursor, a template molecule, and a solvent, wherein the template molecule is a compound of formula:

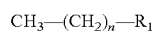

wherein n is a number ranging from 5 to 25, and $R_1$ is

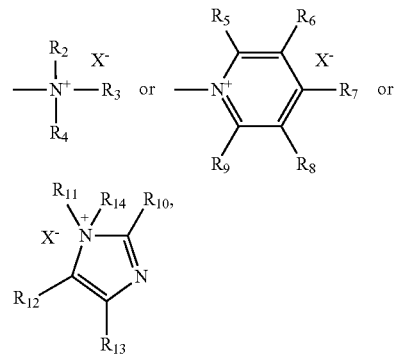

wherein $X^-$ is Cl, Br, I, or F; and $R_2$ through $R_{14}$ are each independently selected from the group consisting of H, Cl, Br, I, OH, and $C_1$-$C_{10}$ alkyl; (b) exposing the composition of (a) to heat or microwave irradiation, wherein silicate-template containing particles are formed; and (c) removing some or all of the solvent from the composition of (b) to produce isolated silicate-template particles; and (d) calcinating the isolated silica-template particles of (c) to produce nanoparticles. The composition of (a) may be an emulsion, particularly a microemulsion.

In particular embodiments, the template molecule is cetylpyridinium bromide (CPB), cetyl trimethylammonium bromide (CTB), or hexadecyltrimethylammonium bromide. Modification of the template molecule results in modification of fiber length and morphology.

The solvent may be any solvent known to those of ordinary skill in the art. For example, the solvent may be an aqueous solvent, an organic solvent, or a mixture of an aqueous solvent and an organic solvent. In particular embodiments, the solvent is one or more solvents selected from the group that includes cyclohexane, hexane, pentane, heptanes, octane, benzene, toluene, xylene, pentanol, butanol, iso-propanol, ethanol, methanol, hexanol, and water. In a particular embodiment, the solvent is a mixture of cyclohexane, pentanol, and water. In a specific embodiment, the solvent is a mixture of cyclohexane and pentanol.

In particular embodiments, the silica precursor is tetraethyl orthosilicate. Other silica precursors include tetraphenylorthosilicate, tetraallyl orthosilicate, tetrabutyl orthosilicate, silicon tetraacetate and tetrapropylorthosilicate.

In particular embodiments, the composition of (a) further comprises a hydrolyzing agent such as urea. Urea promotes hydrolysis of the silica precursor. The composition of (a) may be exposed to heat and/or to microwave irradiation. In a specific embodiment, the composition is heated by or exposed to microwave irradiation.

In some embodiments, the method includes or further includes the step of attaching a ligand to a surface of a nanoparticle of (d). The ligand may be any of the aforementioned ligands. Any method known to those of ordinary skill in the art may be used to attach the ligand to the surface of the nanoparticle. In some embodiments, the ligand is a metal or metal oxide that is sintered to the surface of the nanoparticle. The metal or metal oxide may be any of the aforementioned metals or metal oxides.

This material can be used as a catalyst support in various processes. Some further embodiments of the present invention concern methods of catalyzing a reaction in a reaction mixture that involve contacting a reaction mixture with a nanoparticle of the present invention, wherein the nanoparticle includes a metal or metal oxide attached to a fiber of the nanoparticle. The nanoparticles of the present invention can be applied as heterogeneous catalysts, homogeneous catalysts, photocatalysts, electrocatalysts, organocatalysts, and/or enzymatic catalysts. Reactions can be oxidations, hydrogenations, hydro-treatments, metathesis reactions, isomerizations, rearrangements, elimination reactions, hydrolysis reactions, and condensation reactions.

The present invention further includes methods of delivering drugs to a subject that involve administering to a subject a pharmaceutically acceptable amount of nanoparticles of the present invention, wherein the nanoparticles include one or more drugs attached to at least one fiber of the nanoparticle.

The present invention also concerns kits that include nanoparticles of the present invention in one or more sealed containers. In some embodiments, the nanoparticles are comprised in a chromatography column. In still further embodiments, the kit concerns instructions for use of the nanoparticles of the present invention.

Chromatography methods and columns that include a stationary phase that includes nanoparticles of the present invention are also contemplated as part of the present invention.

The nanoparticles of the present invention can also be applied as agents for the removal of metals from water and oil. In this regard, the nanoparticles are admixed with water or oil that is known or suspected to contain a metal. The nanoparticles can also be used for storage of energy, such as hydrogen. Nanoparticles of the present invention can also be used as a packaging material in the packaging industry.

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention.

The use of the term "or" in the claims is used to mean "and/or" unless explicitly indicated to refer to alternatives only or the alternative are mutually exclusive, although the disclosure supports a definition that refers to only alternatives and "and/or."

Throughout this application, the term "about" is used to indicate that a value includes the standard deviation of error for the device and/or method being employed to determine the value.

As used herein the specification, "a" or "an" may mean one or more, unless clearly indicated otherwise. As used herein in the claim(s), when used in conjunction with the word "comprising," the words "a" or "an" may mean one or more than one. As used herein "another" may mean at least a second or more.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The following figures form part of the present specification and are included to further demonstrate certain aspects of the present invention. The invention may be better understood by reference to one or more of these drawings in combination with the detailed description of specific embodiments presented herein.

(FIG. 3a), 550° C. (FIG. 3b), 800° C. (FIG. 3c), and up to 950° C. (FIG. 3d); fiber thickness before (FIG. 3e) and after (FIG. 3f) calcination.

DESCRIPTION OF ILLUSTRATIVE EMBODIMENTS

Figure 1:
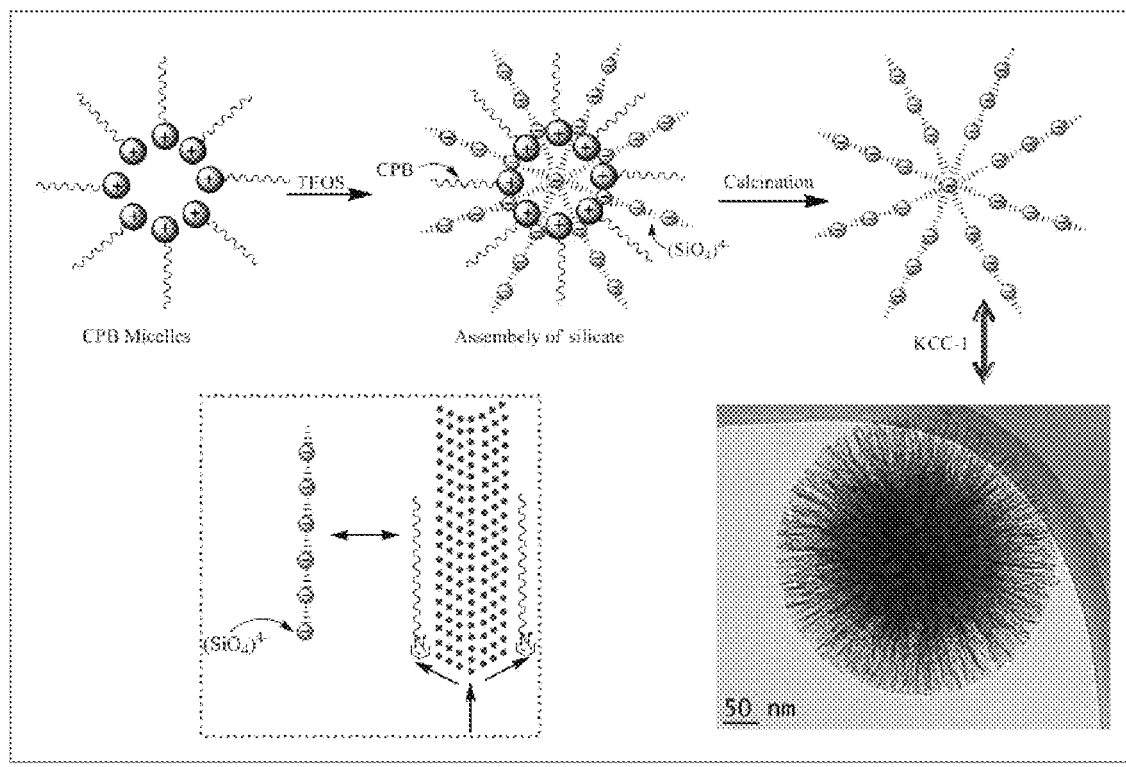
FIG. 1. Schematic representation of silica nanosphere formation.

The present invention is based on the fabrication of a new class of nanoparticles that have a high surface area due to a fibrous surface morphology. The nanoparticles allow for presentation of surface bound molecules in a manner that makes the nanoparticles feasible for a wide variety of applications, such as catalysis, drug delivery, and chromatography.

A. Fabrication

Some embodiments of the present invention concern methods of fabricating nanoparticles of the present invention.

1. Microemulsion Formation

The nanoparticles of the present invention may be fabricated using any material known to those of ordinary skill in the art. In particular embodiments, a micro-emulsion that includes a silica precursor is formed, resulting in nanoparticles composed of silica.

In these embodiments, basic components of a micro-emulsion include a silica precursor, a template molecule, urea, and one or more solvents. The template molecule, may be any of the molecules discussed above. Template molecules in solution may form an aggregate, such as a micelle. The hydrocarbon moieties of the template molecule serve as a scaffold for formation of fibers.

A silica precursor can be obtained from any source known to those of ordinary skill in the art. Silica precursors, template molecules, and other components for fabrication of nanoparticles can be obtained from commercial sources, from natural sources, or can be chemically synthesized. Non-limiting examples of silica precursors include tetraethylorthosilicate (TEOS) or tetramethylorthosilicate (TMOS).

Urea functions to hydrolyze the silica precursor in the microemulsion. Other molecules that can be applied to hydrolyze the silica precursor in the microemulsion include thiourea, amides, ammonia, hydrozine hydrate, sodium hydroxide, sodium carbonate, sodium bicarbonate, sodium phosphate, potassium hydroxide, potassium carbonate, potassium bicarbonate, potassium phosphate, and any other similar agent known to those of ordinary skill in the art.

Following hydrolysis, negatively charged silicate molecules assemble in the space available between self-assembled template molecules. The self-assembled silicate undergoes condensation, which leads to crystallization of the silica material within the template micelles. Morphology of the resulting nanoparticles largely depends on the configuration of the template molecule. In particular aspects, the nanoparticle is a nanosphere, as discussed above.

As discussed above, the solvent component of the microemulsion may be an aqueous solvent, an organic solvent, a dipolar aprotic solvent, or a mixture of these solvents.

The mixture is then exposed to either heat or microwave irradiation at 120 degrees Celsius for 1 to 4 h.

Silica formed can be isolated using any method known to those of ordinary skill in the art, such as by centrifugation. The particles may be washed and air-dried.

The synthesized particles are then calcined. Calcination can be performed using any method known to those of ordinary skill in the art. For example, calcination may involve heating the sample at 550 degrees Celsius under air for 6 hours. Alternatively, calcination may involve heating the sample at a temperature ranging from about 550 degrees Celsius to about 950 degrees Celsius, including all values and ranges there between. Structural characterization can be performed using any of a variety of methods known to those of ordinary skill in the art.

2. Metal Coatings

In some embodiments, the nanoparticles are coated with a ligand, such as a metal or metal oxide. Non-limiting examples of metals for use as ligands that are catalysts include Fe, Cr, Al, Ga, In, Hf, Sn, Zr, Mo, Ti, V, Co, Ni, Cu, Y, Ta, W, Pb, B, Nb, Ge, Pr, U, Ce, Er Nd, Mg, Ca, Ba, Sr, Au, Si or combinations thereof. Furthermore, metal-oxide-based materials are contemplated, including those based on silicon, germanium, tin, lead, antimony, busmuth, polonium, the lanthanides, and the actinides. Metal non-oxide nanoparticles include II-VI, III-V, and IV quantum dots; and metal oxide nanoparticles can include titanium oxide, zirconium oxide, aluminum oxide, iron oxide, tungsten oxide, cerium oxide, antimony oxide and silicon oxide. Syntheses of metal oxides have been carried out using inorganic salts, such as of $Fe^{3+}$, $Cr^{3+}$, $Al^{3+}$, $Ga^{3+}$, $In^{3+}$, $Hf^{4+}$, $Sn^{4+}$, $Zr^{4+}$, $Nb^{5+}$, $W^{6+}$, $Pr^{3+}$, $Er^{3+}$, $Nd^{3+}$, $Ce^{3+}$, $U^{3+}$, $Y^{3+}$ and combinations thereof.

The nanoparticles of the invention may include a platinum group transition metal expected to have potent activity as a catalyst for electrodes and/or alloy nanoparticles mainly composed of such platinum group transition metals. The platinum group transition metal may be selected from among Pt, Ru, Ir, Pd, Os and Rh and may comprise a single species or a mixture thereof.

In some embodiments, a metal coating is deposited on the surface of the nanoparticle. The metal coating may be deposited using any method known to those of ordinary skill in the art. Non-limiting examples of such techniques include chemical vapor deposition, ion implantation, spray painting, and the like.

Metal coatings may be fabricated by placing silica nanoparticles of the present invention in a composition comprising a metal (or metal salt) and a solvent (or mixture of solvents).

Some examples of metal salts include platinum salts, ruthenium salts, iridium salts, palladium salts, osmium salts, and rhodium salts. The platinum salt includes those containing $Pt^{2+}$, $Pt^{3+}$ or $Pt^{4+}$, which can be represented, for example, in the form of $PtX_2$, $PtX_3$, $PtX_4$, $[PtA_6]X_2$, $M^1_2[PtX_4]$, $M^1_2[PtX_{2Y2}]$, $M^1[PtX_{3Y}]$, $M^1[PtX_{2Y2}]$ or $M^1_2[PtX_6]$ (in which X and Y each is an anion such as $F^-$, $Cl^-$, $Br^-$, $I^-$, $OH^-$, $CN^-$, $NO_3^-$, $N_3^-$, $CH_3COO^-$, $SCN-$, acetylacetonato, $½SO_4^{2-}$ or $½CO_3^{2-}$; $M_1$ is a monovalent cation such as K, Na or H; and A is $NH_3$ or an amine). Specifically, there may be mentioned $PtCl_2$, $PtBr_2$, $PtI_2$, $Pt(CN)_2$, $Pt(SCN_2$, $PtCl_3$, $PtBr_3$, $PtI_3$, $PtF_4$, $PtCl_4$, $PtBr_4$, $PtI_4$, $K_2[PtCl_2(acac_2]$ and $H2PtCl_6$.

The ruthenium salt includes those containing $R^{2+}$, $Ru^{3+}$ or $Ru^{4+}$, which can be represented, for example, in the form of $RuX_2$, $RuX_3$, $RuX_4$, $[RuX_6]M^1_3$ or $M^1[RuX_4]$ (in which X is a halogen such as Cl or Br or an anion such as $NO_3^-$ or $SO_4$, and $M^1$ is a monovalent cation such as K, Na, Rb, Cs or H).

The iridium salt includes those containing $Ir^+$, $Ir^{2+}$, $Ir^{3+}$ or $Ir^{4+}$, which can be represented, for example, in the form of $IrX$, $IrX_2$, $IrX_3$, $IrX_4$, $[IrX_6]M^1_3$ or $M^1[IrX_4]$ (in which X is a halogen such as Cl or Br or an anion such as $SO_4$, and $M^1$ is a monovalent cation such as K, Na, Rb, Cs or H).

The palladium salt includes those containing $Pd2+$, which can be generally represented in the form of $Pd—Z_2$. Z is a halogen such as Cl, Br or I or a moiety forming such a salt as acetate, trifluoroacetate, acetylacetonate, carbonate, perchlorate, nitrate, sulfate or oxide. Some examples include $PdCl_2$, $PdBr_2$, $PdI_2$, $Pd(OCOCH_3)_2$, $Pd(OCOCF_3)_2$, $PdSO_4$, $Pd(NO_3)_2$ and PdO.

The osmium salt includes those containing $Os^+$, $Os^{2+}$, $Os^{3+}$ or $Os^{4+}$, which can be expressed, for example, in the form of $OsX$, $OsX_2$, $OsX_3$ or $OsX_4$, $[OSX_6]^1_3$ or $M^1[OsX_4]$ (in which X is a halogen such as Cl or Br or an anion such as $SO_4$, and M1 is a monovalent cation such as K, Na, Rb, Cs or H). As specific examples, there may be mentioned $OsBr_4$, $OSO_4$, $OsCl_4$, $KOs(SO_4)_2$, $RbOs(SO_4)_2$ and $CsOs(SO_4)_2$.

The rhodium salt includes those containing $Rh^{3+}$, which can be represented in the form of $RhX_3$, $Rh_{2X6}$, $[RhA_6]X_3$, $M^1_3[RhX_6]$ or $M^1[RhX_4]$ (in which X is a halogen such as F or Cl or an anion such as CN or $SO_4$; $M^1$ is a monovalent cation such as K, Na or H; and A is $NH_3$ or an amine). As specific examples, there may be mentioned $Rh_{2O3}$, $RhO_2$, $Rh_2(SO_4)_3$, $Rh(OH)_3$, $Rh(NO_3)_3$, $RhCl_3$, $RhF_3$, $Rh(CN)_3$, $KRh(SO_4)_2$, $Na_2RhCl_4$, $NaRh(SO_4)_2$ and $HRh(SO_4)_2$.

The solvent capable of dissolving or dispersing the metal salt differs depending on the functional groups of the solvent. The solvent may include water, ketones such as acetone and methyl ethyl ketone, esters such as ethyl acetate, alcohols such as methanol and ethanol, aprotic polar solvents such as dimethylformamide, dimethyl sulfoxide, sulfolane, diglyme and hexamethylphosphorotriamide, and, further, nitromethane and acetonitrile, among others. Water and hydrophilic organic solvents, such as alcohols or ketones, in admixture with water can be suitably used.

The concentration of the metal salt may vary depending on the solvent used for dissolving the salt but may be in an amount from about 0.001% to the saturated solution concentration for the salt.

3. Other Ligands

Some embodiments of the present invention concern nanoparticles with one or more attached ligands other than metals. Examples of ligands include organic molecules and drugs. Also contemplated as ligands are semi-conductor materials and ceramics. Some examples of ceramic materials include brushite, tricalcium phosphate, alumina, silica, and zirconia. In some embodiments, the ligand is a polymer. Examples of polymers include polystyrene, silicone rubber, polycarbonate, polyurethanes, polypropylenes, polymethylmethacrylate, polyvinyl chloride, polyesters, polyethers, and polyethylene. Biodegradable, biopolymer (e.g., polypeptides such as BSA, polysaccharides, etc.), other biological materials (e.g., carbohydrates), and/or polymeric compounds are contemplated as possible ligands. Gold is also contemplated as a ligand due to its well-known reactivity profiles and biological inertness.

The nanoparticles set forth herein may be coated with a ligand that is selected from the group consisting of dextran, dendrimers, amphiphilic polymers/bio-polymers (e.g., phospholipids and peptides), polymers, surfactants or chemical compounds with chelating properties.

4. Surface Modification and Linkers

The nanoparticles of the invention may be subjected to surface modification so that a ligand can readily bind to the surface thereof. The surface modification of the nanoparticles can be accomplished, for example, by treating the nanoparticle solution with a coupling agent (linker)-containing solution. For example, the coupling agent may be a silane coupling agent.

Exemplary functional groups of linkers include, but are not limited to, the following: a hydroxyl, a carboxyl, an amino, a phosphate, a phosphonate, a sulfate, a sulfite, a sulfenate, a sulfinate, a sulfonate, a sulfoxide, a sulfone, an amide, an ester, a ketone, an aldehyde, a nitrile, an alkene, an alkyne, an ether, a thiol, a hydroxyamic acid, a silane, a silicate, a carbamodithionate, a dithionate, a mercaptan, a disulfide, a peroxide and a nitronate group.

The linker can be used in the form of a diluted solution prepared by using such a solvent as mentioned above and is generally used in the form of an aqueous solution. As for the linker concentration, any appropriate concentration can be used and, for example, a linker solution having a concentration of 0.001 to 5.0%, or 0.01 to 1.0%, may be added to the solution.

While numerous types of linkers are known that can successfully be employed to conjugate moieties, certain linkers will generally be preferred over other linkers, based on differing pharmacologic characteristics and capabilities.

Exemplary preferred linkers include, but are not limited to, polyethylene glycol, a dendrimer, a molecule comprising a tert-butyl protecting group, a molecule comprising an isobutylene oxide connection, an amino benzyl alcohol, a hydroxy benzyl alcohol connection, an aminobenzene dimethanol, an aminobenzene trimethanol, a hydroxybenzene dimethanol, a hydroxybenzene trimethanol, a vinyl sulfoxide, a substituted vinyl sulfoxide, a substituted methoxymethyl connection, a substituted vinyl ether connection, a carbonate connection, an ester connection, an anhydride connection, a substituted carbamic anhydride connection, a carbonic anhydride connection, a substituted urea connection, a substituted urethane connection, a substituted guanidine connection, an ether connection, a mercaptan connection, a sulfoxide connection, a sulfinate connection, a sulfonate connection, a sulfenate connection, a nitronate connection, a sulfite connection, a sulfate connection, a phosphate connection, a phosphonate connection, a phosphine connection, a silane connection, a silicate connection, a disulfide connection, a peroxide connection, an alkane connection, an alkene connection, an alkyne connection, an iodonium connection, an amino connection, a substituted allyl ether connection, a substituted benzyl ether connection and an imine connection. Linkers that contain a disulfide bond that is sterically "hindered" may be included to prevent premature release of the therapeutic agent.

In some embodiments, the linker is further defined as a cross-linking reagent. Cross-linking reagents are used to form molecular bridges that tie together functional groups of two different molecules.

5. Shape

There is no particular limitation to the shape of the nanoparticles, which may be, for example, spherical, irregular, elongated, ellipsoids, rods, triangles, hexagons, and the like, or a combination comprising at least two or more shapes. In particular embodiments, the nanoparticles are essentially spherical (i.e., nanospheres).

6. Solutions

When in solution in a composition, the nanoparticles may generally be present in the solution in an amount of about 0.0000001 wt % to about 100 wt % (solid-free powder), based on the total weight of the solution. In one embodiment, the nanoparticles may generally be present in the solution in an amount of about 0.000001 wt % to about 15 wt %. In another embodiment, the nanoparticles may generally be present in the solution in an amount of about 0.01 wt % to about 1 wt %. In yet another embodiment, the nanoparticles may generally be present in the solution in an amount of about 1 wt % to about 10 wt %.

7. Other Modifications

In some embodiments, the nanoparticles can be functionalized with molecules to provide a positive or negative charge. Alternatively, the nanoparticles can be functionalized with molecules to provide a hydrophobic or hydrophilic surface.

B. Applications

Nanoparticles of the present invention can be used in a wide variety of applications. For example, as discussed above, they can be used as a catalyst or catalyst support. They can also be used for removal of metals from water and oil. They can further be used for storage of energy such as hydrogen. They can be used in the packaging industry as a packaging material. They can also be applied in drug delivery, gene delivery, and medical imaging. The nanoparticles can be applied in catalysis, the transport of agents, drug delivery, packaging, as sensors, and combinations thereof. A drug useful in the invention can be a therapeutic compound(s), radioactive compound(s), chemotherapy agent(s), DNA/RNA molecule(s), protein(s), or MRI contrast agent(s).

The mode of delivery can include any method known to those of ordinary skill in the art. Examples include aerosol delivery to lungs via inhalation, subcutaneous injection, oral ingestion, transdermal delivery, and targeted delivery.

For applications in catalysis, catalytically active sites can be located on the surface of fibers of the nanoparticles, or incorporated within the fibers of nanoparticles, or a combination of both.

Organometallic compounds may be bound to the nanoparticle to provide for catalysis applications. Non-limiting examples of catalysis applications include partial oxidation reactions, oxidation reactions (e.g., to destroy organic pollutants in the air or water), biocatalysis (e.g., using enzyme-containing hollow spheres as bioreactors), enantioselective catalysis (e.g., to produce precursors to drug molecules), on-demand catalysis, and organic and inorganic reactions catalyzed by metals.

The nanoparticles of the present invention may also find applications as ceramics, e.g., coatings as a thin or dielectric material for electronics. In addition they may be used as a component in dispersions such as paints, sun tan lotions, and perfumes. Agricultural applications would include use as delivery particles for pesticides, fungicides, or fertilizers. For consumer food products the cargo to be bound to the nanoparticle can include preservatives, flavorants, odorants, dyes, and the like.

Accordingly the present invention includes the ability to functionalize nanoparticles to allow payloading of a wide variety of agents. The nanoparticles of the present invention can also be applied in hydrogen storage, as column packing for chromatography, and as nano-composite materials.

C. Kits

Certain embodiments of the present invention are generally concerned with kits that include nanoparticles of the present invention. For example, in some embodiments the kit includes one or more sealed containers that contain a predetermined quantity of nanoparticles as set forth herein.

A kit of the present invention may include a sealed vial containing a predetermined quantity of nanoparticles of the present invention. In further embodiments of the present invention, the nanoparticles are coated with a metal ion or other ligand as discussed above.

D. Examples

The following examples are included to demonstrate preferred embodiments of the invention. It should be appreciated by those of skill in the art that the techniques disclosed in the examples that follow represent techniques discovered by the inventor to function well in the practice of the invention, and thus can be considered to constitute preferred modes for its practice. However, those of skill in the art should, in light of the present disclosure, appreciate that many changes can be made in the specific embodiments that are disclosed and still obtain a like or similar result without departing from the spirit and scope of the invention.

Example 1

High Surface Area Silica Nanospheres with Fibrous Morphology

The fabrication of the nanoparticles KCC-1 first involved formation of a microemulsion using cetyl pyridinium bromide (CPB) or cetyl trimethylammonium bromide (CTB) as a template and urea in a cyclohexane:pentanol:water mixture. A silica precursor (tetraethyl orthosilicate) was hydrolyzed by urea, followed by assembly of these hydrolyzed, negatively charged silicate molecules in the space available between the self-assembled template molecules (FIG. 1) to aggregate along the free radical directions and restricted tangential direction. Finally, condensation of the self-assembled silicate led to the crystallization of silica material within the isolated micelles (dispersed in the solvent), yielding fibrous silica nanospheres.

An alternative template, which results in nanoparticles with a different morphology, occurred when the template was changed to hexadecyltrimethylammonium bromide or benzyldimethylhexadecylammonium chloride. Thus, morphology can be modified based on the organization of particular surfactant molecules within the micellar liquid, which often depends upon the delicate hydrophobic-hydrophilic equilibrium among templates, precursor materials, additives, and solvents. It was observed that the fibrous morphology was lost when the template was changed to benzyldimethylhexadecyl ammonium chloride. This influence by the template molecules on morphology has been linked to the surfactant packing parameter, which depends upon the volume and length of the non-polar template chain (in this case cetyl) as well as the effective area of the polar head (in this case pyridinium or trimethylammonium).

To study the effect of the reaction solvent on the formation of the nanoparticles, several solvent combinations of cyclohexane and hexane with pentanol, butanol or isopropanol were examined. Although silica spheres with fibrous morphologies were observed in all cases, the polydispersity varied strongly, leading to a particle size distribution between 50 nm and 200 nm. The mixture of cyclohexane and pentanol was a useful solvent-yielding material with a narrow particle size distribution.

Figure 2:
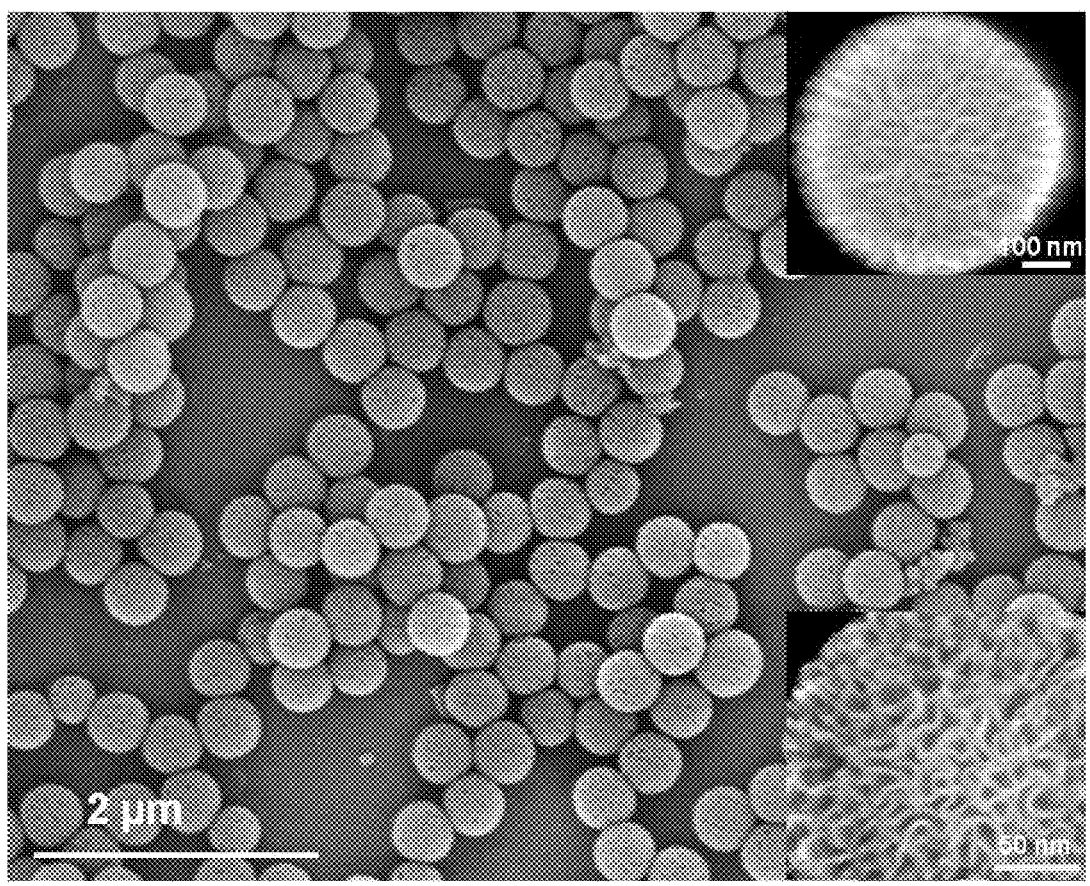
FIG. 2. HRSEM image of silica nanospheres.
Figures 3A, 3B, 3C, 3D, 3E, 3F:
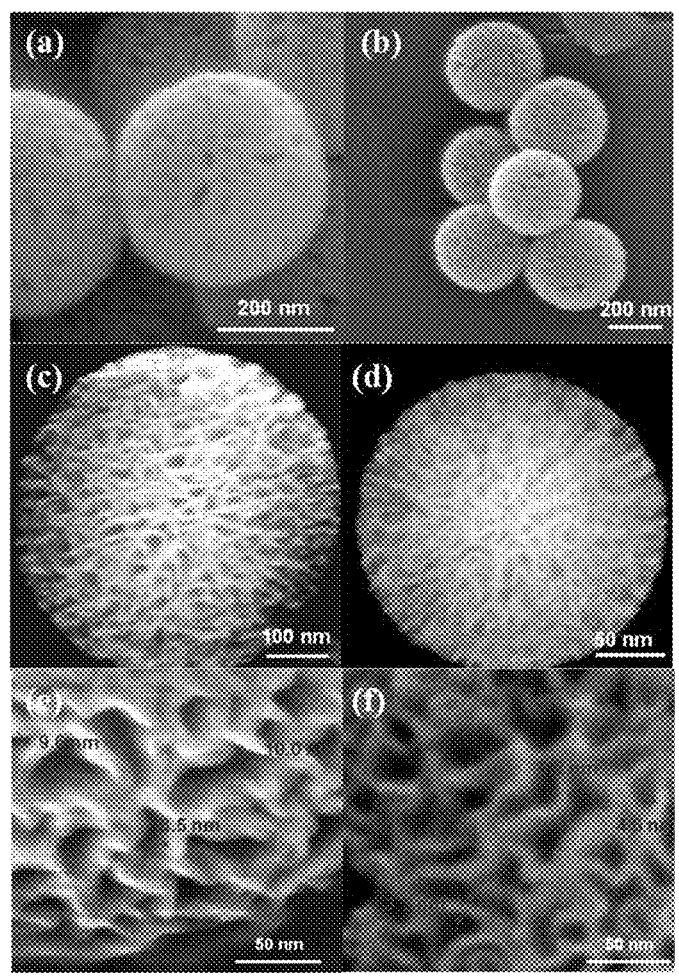
FIGS. 3a-3f. HRSEM image of silica nanospheres after calcinations at 400° C.

The synthesis of fibrous silica nanospheres (KCC-1) with high surface area was performed. Silica nanospheres with this type of fibrous morphology (FIGS. 2 and 4) is unprecedented. In a typical synthesis, TEOS (2.5 g, 0.012 mol) was dissolved in a solution of cyclohexane (30 mL) and pentanol (91.5 mL). Next, the stirred solution of CPB (1 g, 0.0026 mole) and urea (0.6 g, 0.01 mole) in water (30 mL) was added. This mixture was stirred for 30 minutes at room temperature, and the resulting solution was placed in a Teflon-sealed MW-reactor. The reaction mixture was exposed to MW irradiations (400 W power) at 120° C. for 4 h. After completion of the reaction, the mixture was allowed to cool to room temperature, and the silica formed was isolated by centrifugation, washed with distilled water and acetone, and air-dried for 24 h. The as-synthesized material was then calcinated at 550° C. for 6 h under air. No special precautions or complex techniques were needed during this synthesis, thus making the total process economical and sustainable.

High-resolution scanning electron microscopy (HRSEM) images (FIG. 2) revealed that the sample consists of uniformly sized colloidal spheres with diameters that range from 250 nm to 450 nm. Close inspection of these silica spheres (see insets, FIG. 2) shows that the material possesses dendrimeric fibers (angle shaped with a fiber thickness of 8-10 nm) arranged in three dimensions to form spheres, which can allow easy access to the available high surface area.

Because of the fibrous nature of this material, it is possible to obtain an ultra-high concentration of highly dispersed and easily accessible metal particles on the surface of the silica spheres. Importantly, SEM analysis (FIGS. 3a-3f) of silica spheres at different temperatures from 400 to 950° C. indicates that the silica nanospheres are highly stable (thermally and mechanically) with no visible changes in morphology or size of the particles. No coalescence of particles occurred even after severe thermal treatment. This is an important observation because thermal stability is required for a catalyst operating in a highly exothermic medium.

Notably, the thickness of the fibers reduced from 8-10 nm before calcination (FIG. 3e) to 4-5 nm after calcination at 550° C. (FIG. 3f), which occur due to loss of the template coating around the fibers. No further reduction in the thickness or distance between two fibers was observed, even with an increase in the calcination temperature up to 950° C., while the microstructure of the silica remained intact. This result indicates that the nanospheres of the invention may be used to prepare easily accessible catalysts in the fibrous channels of the silica nanospheres.

Figure 10A:
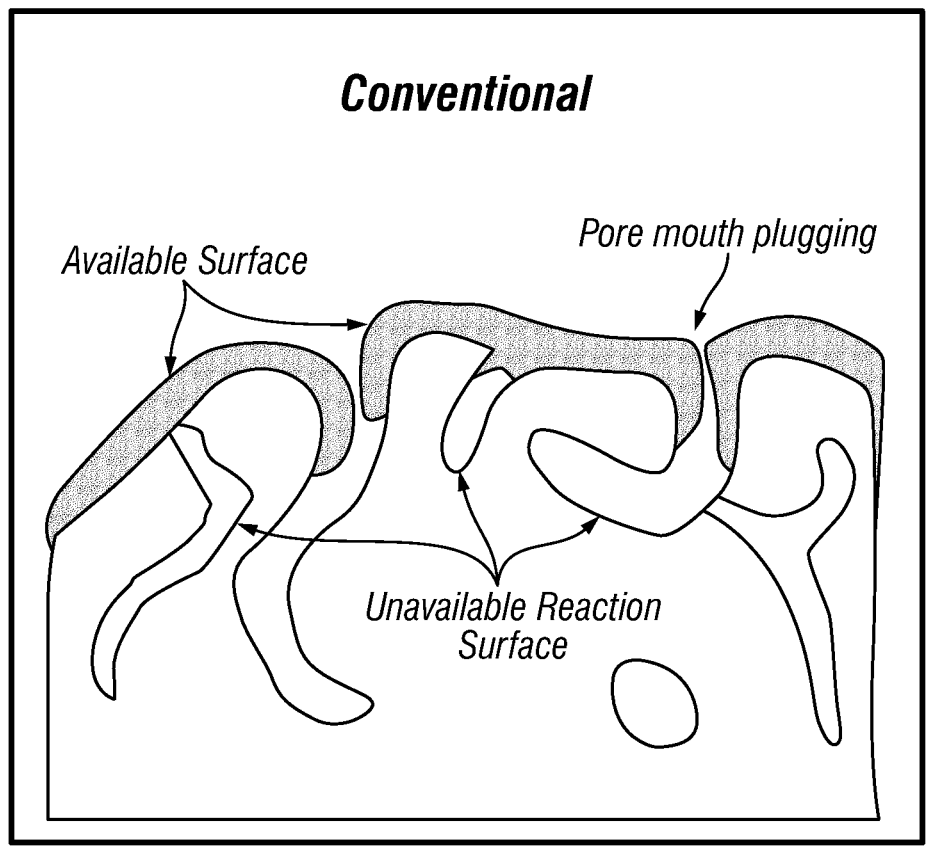
FIGS. 10a-10c. Differences between conventional porous silica, (FIG. 10a), MCM-41 (FIG. 10b), and KCC-1 (FIG. 10c).
Figures 10A, 10B, 10C:
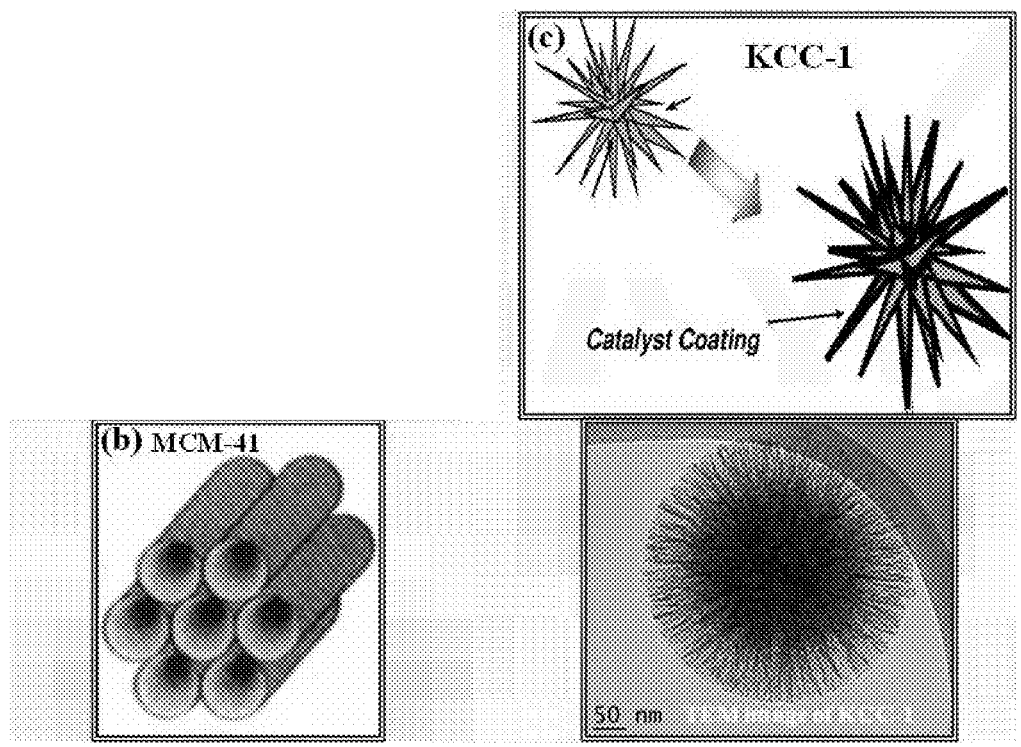

The effectiveness of porous materials as catalyst supports is primarily due to their microstructures, which allow active catalytic sites to disperse along the large internal surfaces and pores, which in turn improves the catalyst's activity. However, poor accessibility to the active sites inside the pores (FIG. 10a) or inside the channels (FIG. 10b) sometimes limits applications where significant mass transport is essential. Silica supports with easily accessible high surface areas (i.e., not in the pores) are therefore desirable. The fibrous morphology of the silica nanospheres (KCC-1) have an unusually high surface area due to the presence of dendrimeric silica fibers (FIG. 10c) and respective channels (rather than pores). These nanospheres will likely allow preparation of ultra-high concentrations of sintering-proof catalysts in the fibrous channels of the nanospheres (as in carbon nanotubes), which is difficult in conventional mesoporous silica.

Figures 11A, 11B, 11C, 11D:
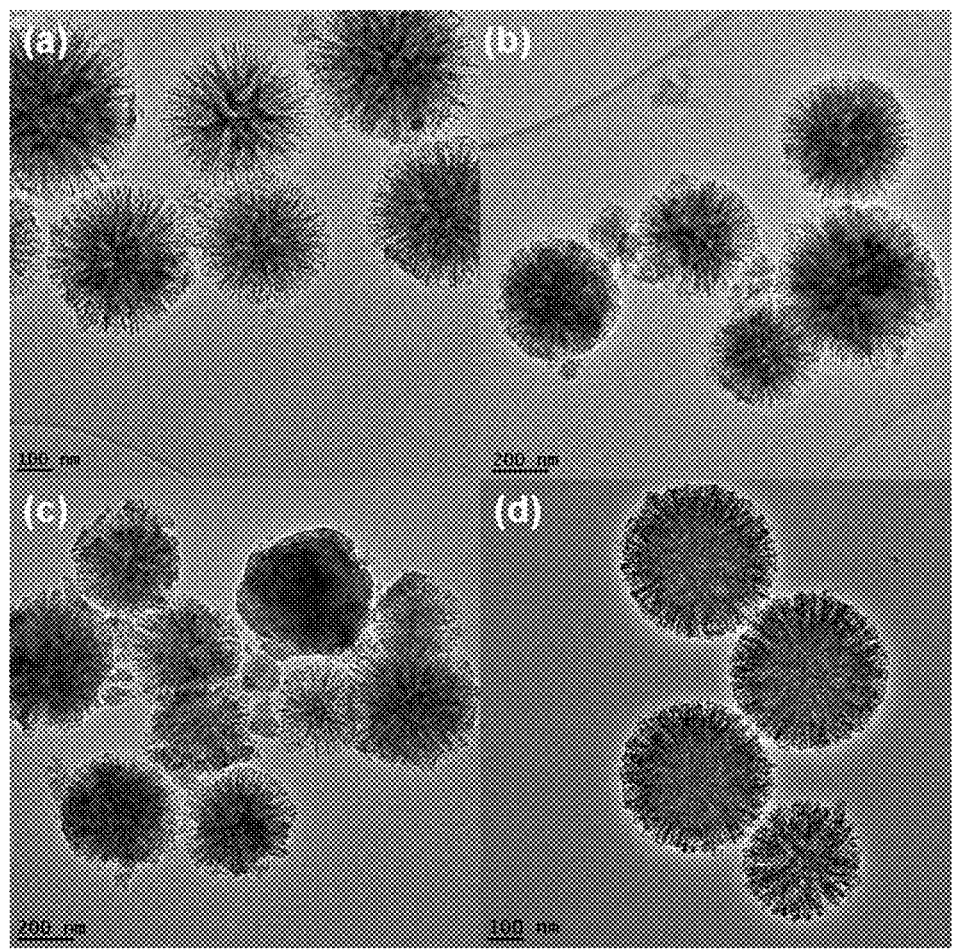
FIGS. 11a-11d. HRTEM images of KCC-1 after mechanical compression at pressures of 43 MPa (FIG. 11a), 130 MPa (FIG. 11b), 216 MPa (FIG. 11c), and after heating in boiling water for 24 h (FIG. 11d).

The mechanical stability of the silica spheres was further examined using high-resolution transmission electron microscopy (HRTEM). It was observed that the fibrous morphology of KCC-1 remains unaffected even after mechanical compression up to 216 MPa pressure (FIG. 11a-11c). That level of mechanical stability is comparable to MCM-41, which is affected at a pressure of 86 MPa. Thus, KCC-1 possesses good mechanical stability, meaning that breaking and plugging of the catalytic bed can be avoided. KCC-1 also possesses high hydrothermal stability; even after heating in boiling water for 24 h, the fibrous morphology remained unchanged (FIG. 11d). Thus, silica nanospheres of the invention have significant thermal, mechanical and hydrothermal stabilities, which are essential attributes for good catalytic support.

Figure 4:
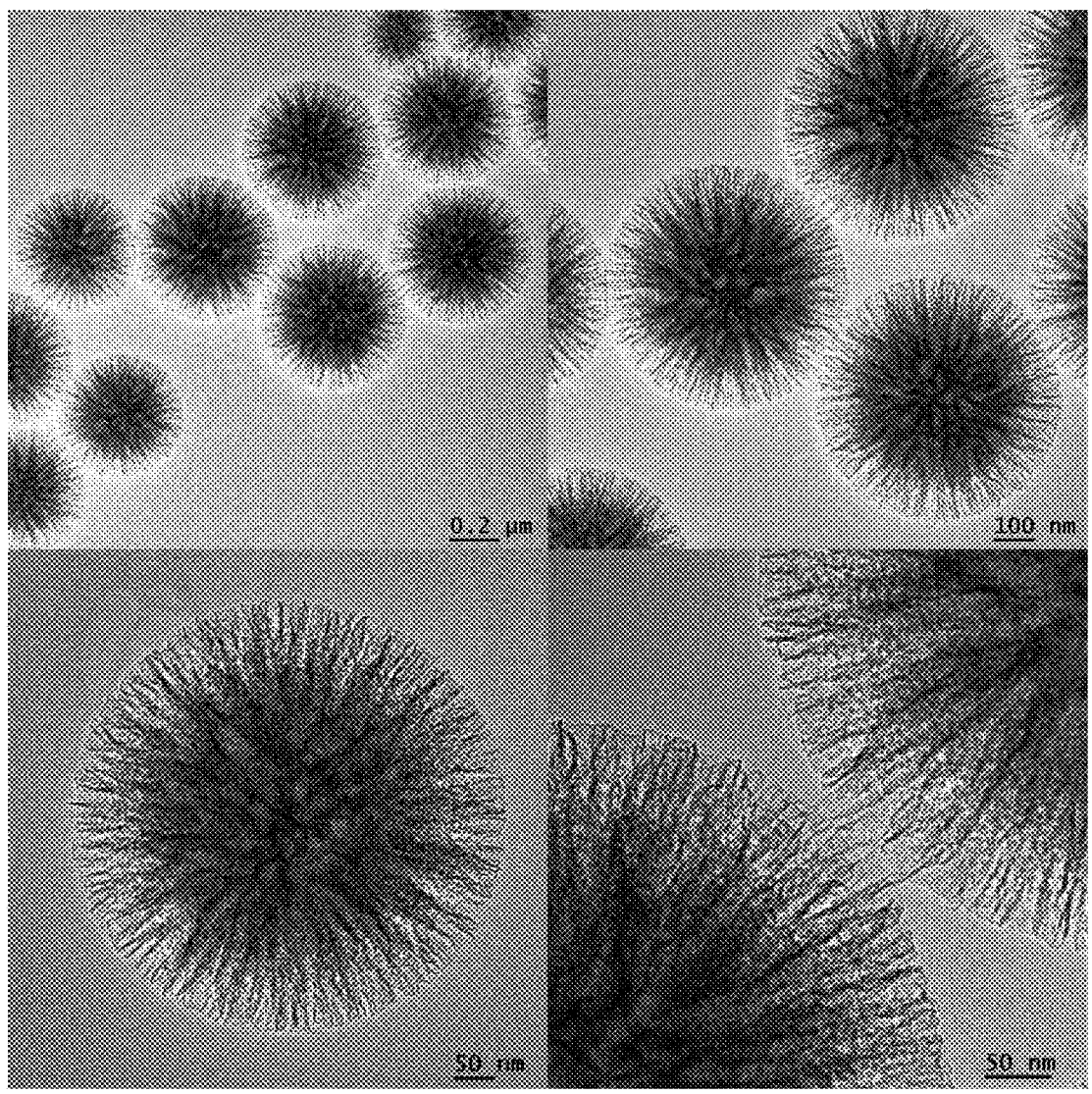
FIG. 4. HRTEM image of silica nanospheres.

Further structural characterization of the as-synthesized silica nanospheres was performed by high-resolution transmission electron microscopy (HRTEM) (FIG. 4). A closer inspection of these images revealed well-defined and highly ordered fibers coming out of the center of the particle and distributed over all directions uniformly.

SEM and HRTEM imaging of silica nanospheres indicates the presence of fibers, but it was unclear whether these fibers grew from the center of the spheres or whether they were present only on the surface of the silica spheres with the spheres having solid cores. Three-dimensional (3D) tomography of KCC-1 revealed that the fibers grow uniformly from the centers of the spheres along the free radical directions and the restricted tangential direction to form fibrous spherical silica particles, as illustrated by a video clip showing the results from the 3D tomography study.

Figure 5:
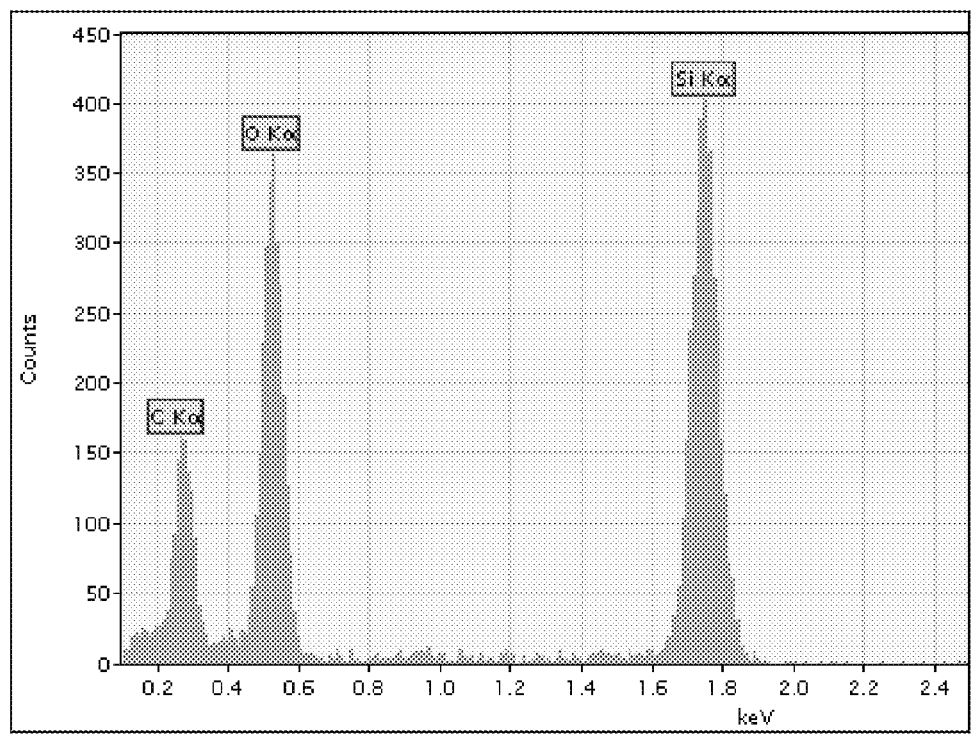
FIG. 5. EDX analysis of silica nanospheres.

Energy Dispersive X-ray (EDX) analysis was utilized to determine the chemical composition of the KCC-1 nanospheres. As shown in FIG. 5, the sample was composed of only silicon and oxygen and carbon (the carbon being from the TEM grid and also from some traces of template). Those results confirmed the formation of a silica material. Nearly similar percentages of silicon and oxygen were observed in the EDXS analysis of the edges and the central parts of the nanospheres.

Figure 6A:
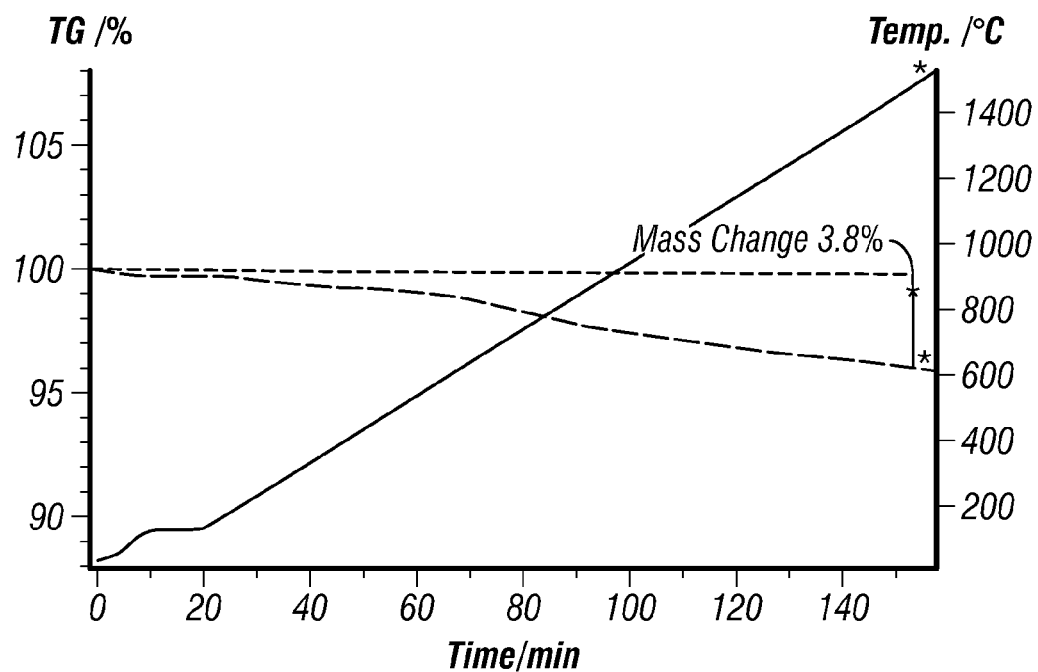
FIGS. 6a-6b. TGA (thermogravimetric analysis) (FIG. 6a) and $^{29}$Si CP-MAS NMR spectrum of KCC-1 (FIG. 6b).
Figure 6B:
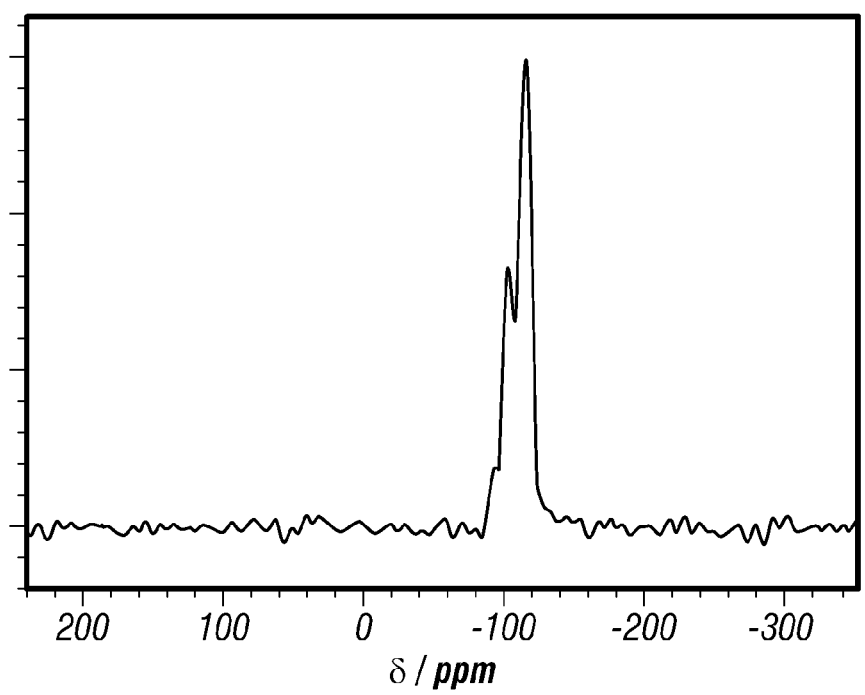
Figure 7:
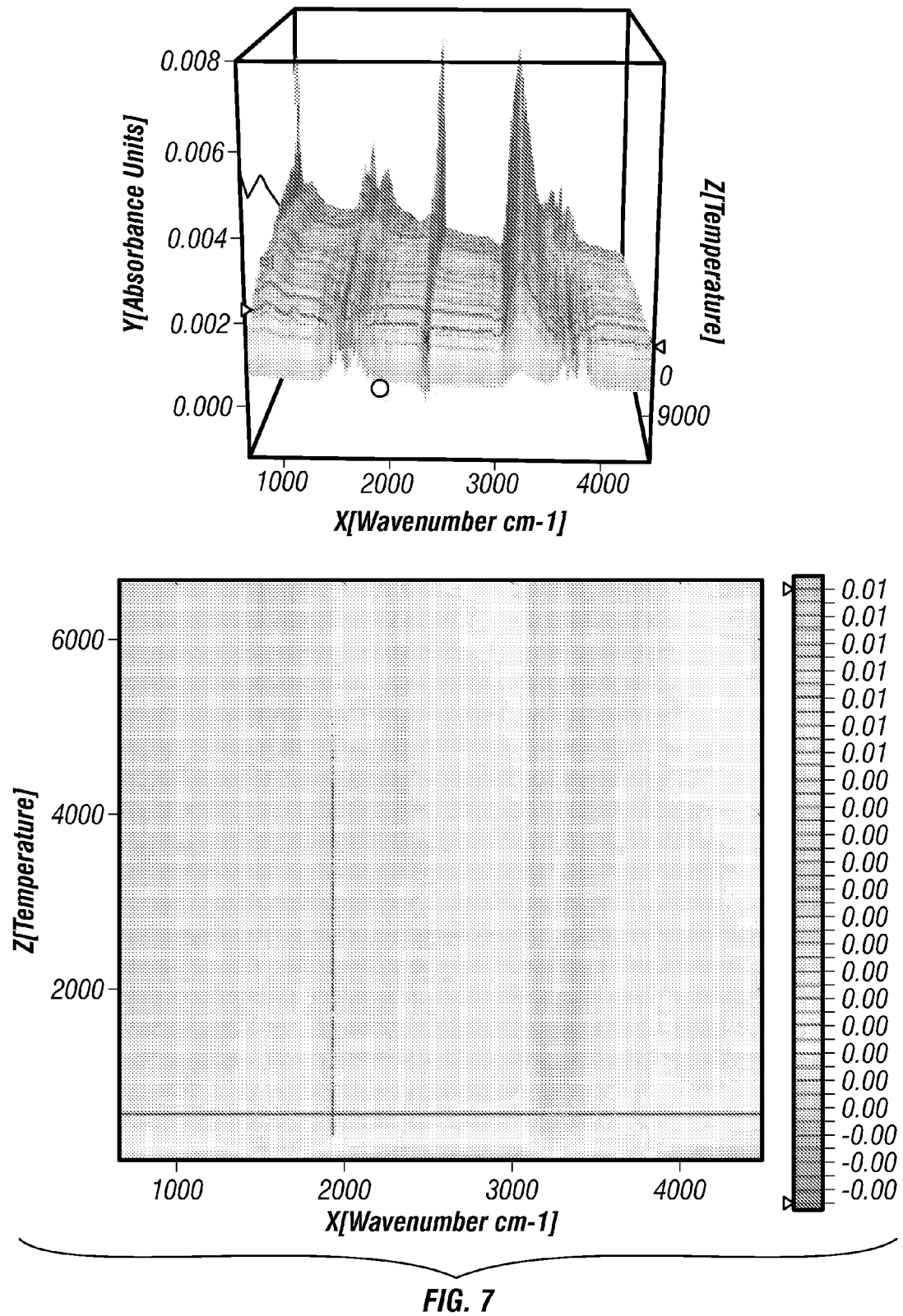
FIG. 7. TG-IR (TGA/Fourier transform infrared) analysis of the silica nano-spheres (called KCC-1).
Figure 7:
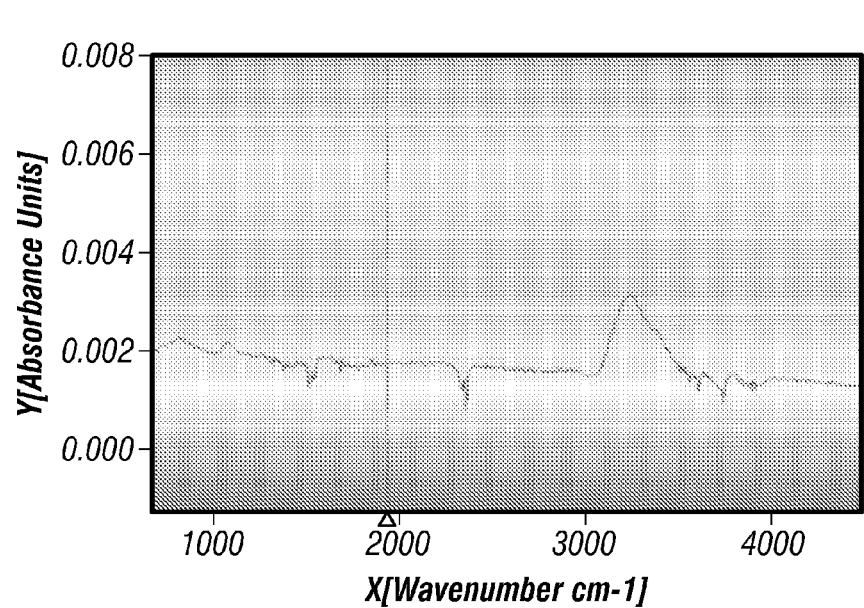
Figure 7:
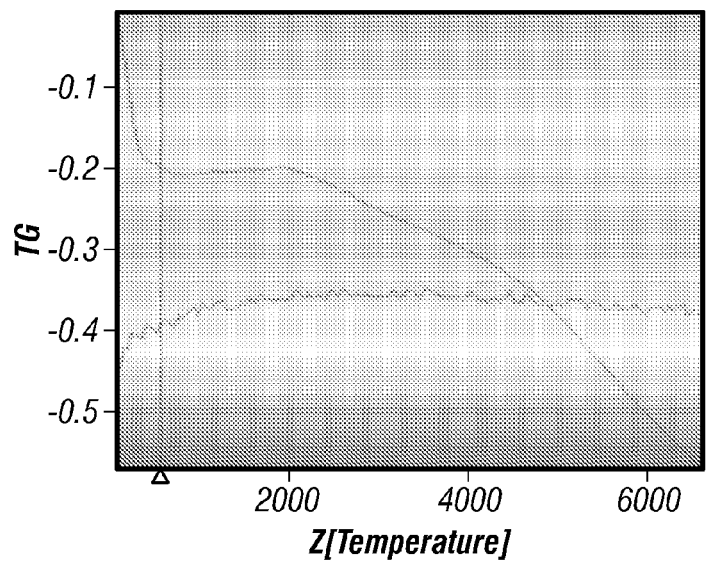
Figure 7:
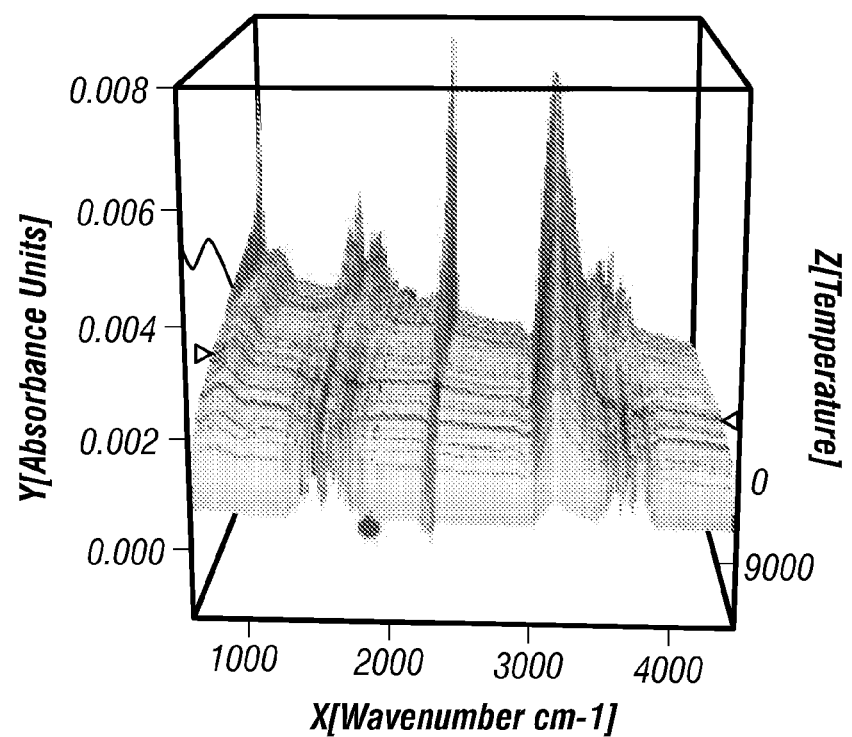
Figure 7:
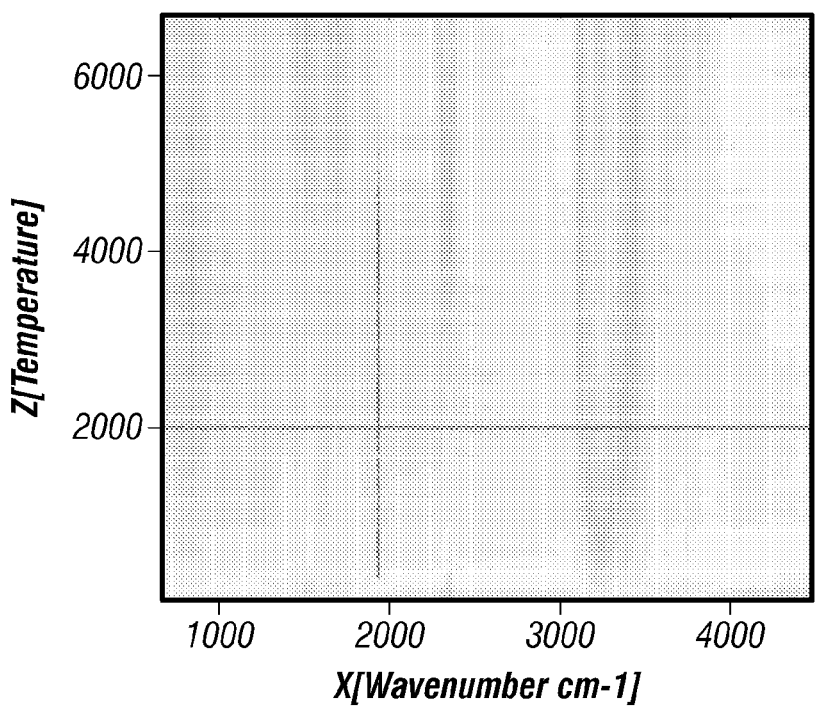
Figure 7:
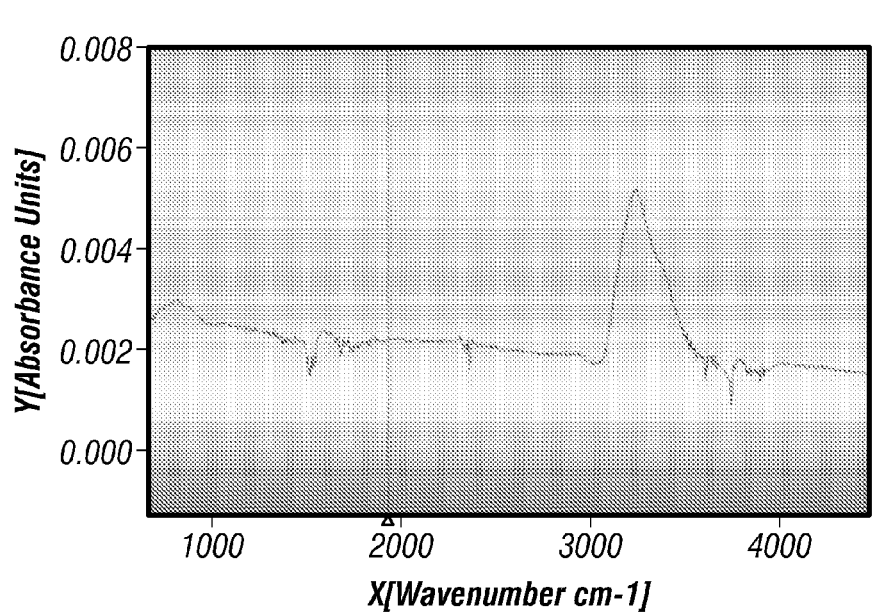
Figure 7:
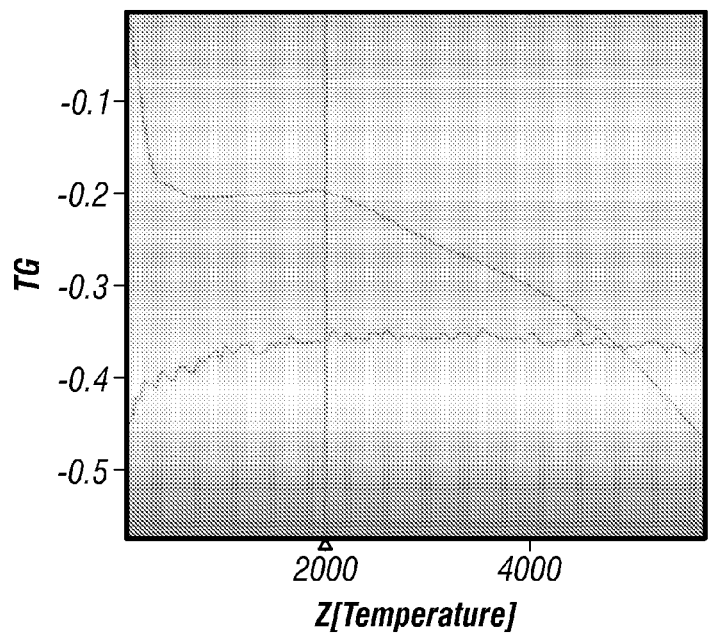
Figure 7:
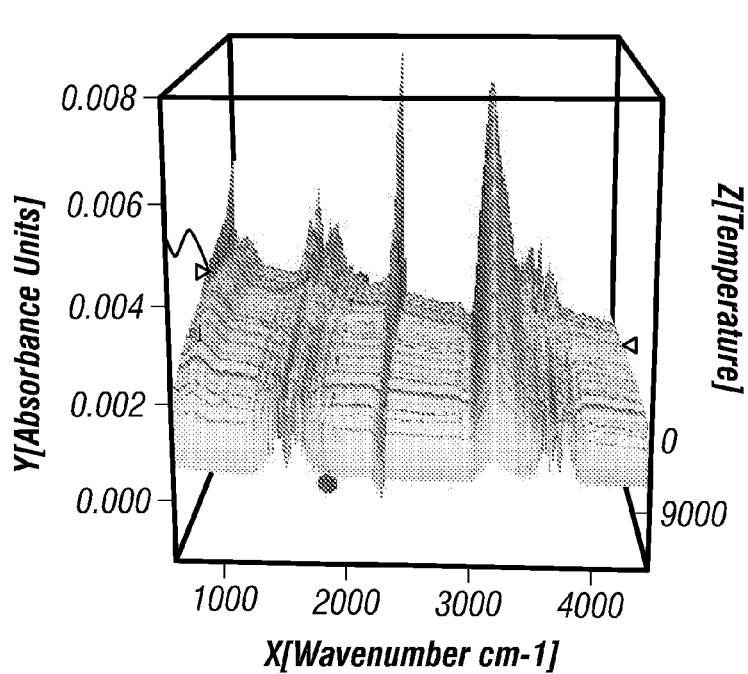
Figure 7:
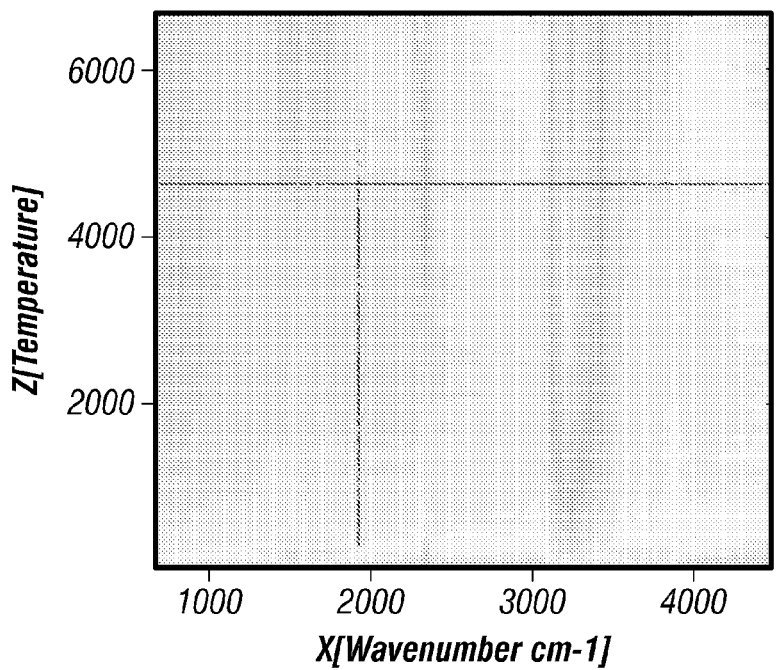
Figure 7:
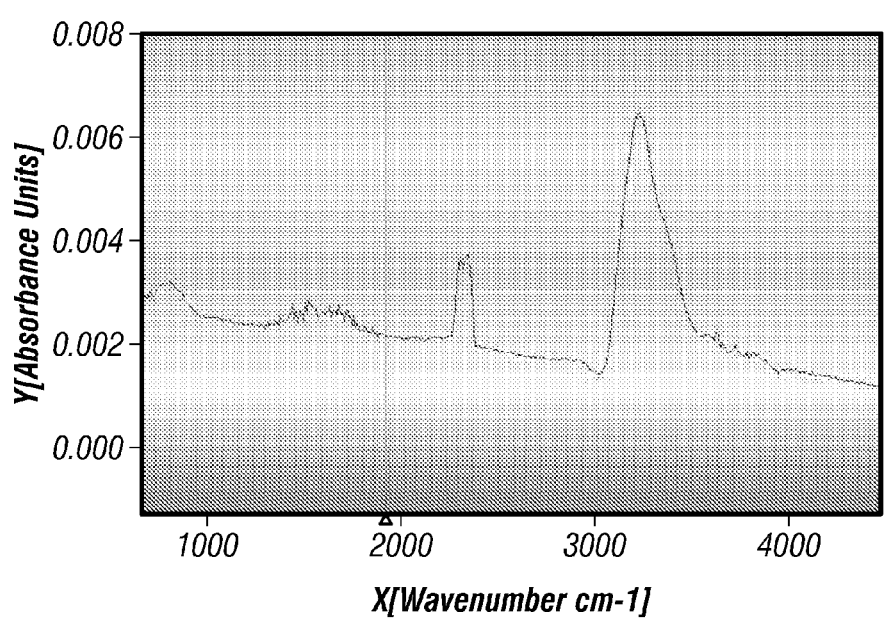
Figure 7:
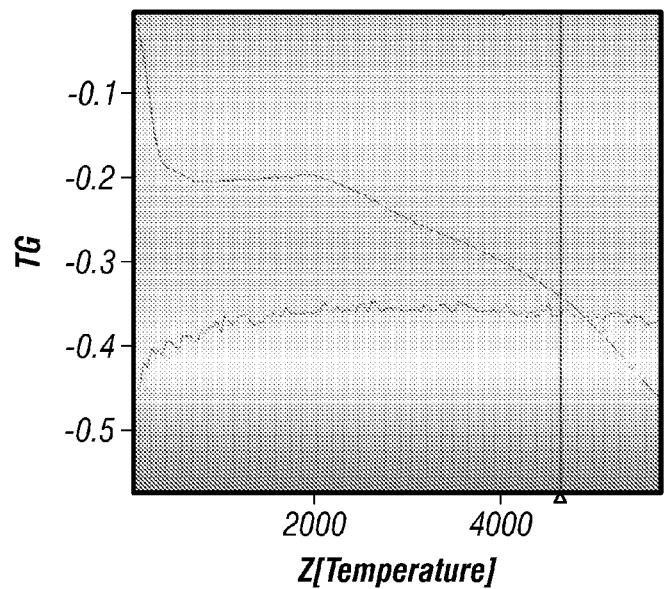
Figure 8:
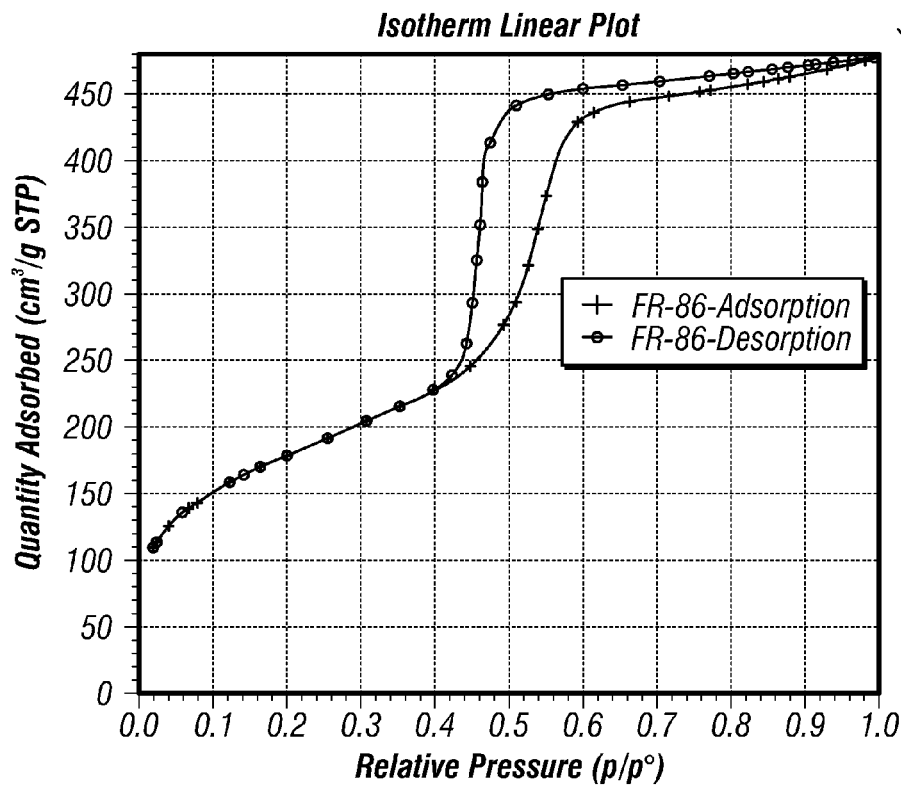
FIG. 8. BET (Brunauer-Emmett-Teller) analysis of KCC-1.
Figure 8:
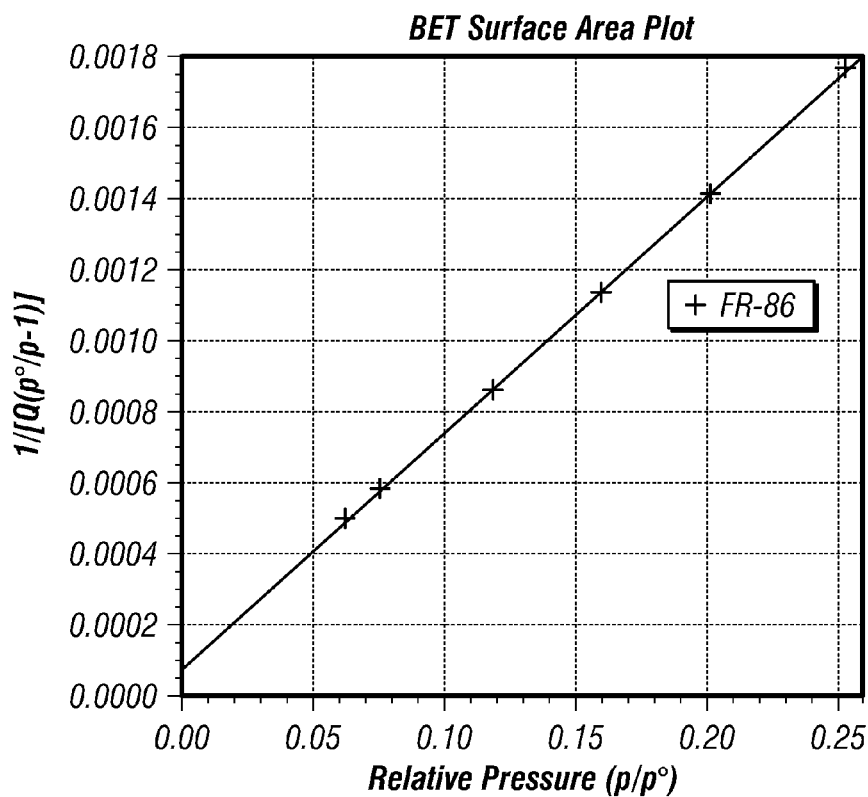
Figure 8:
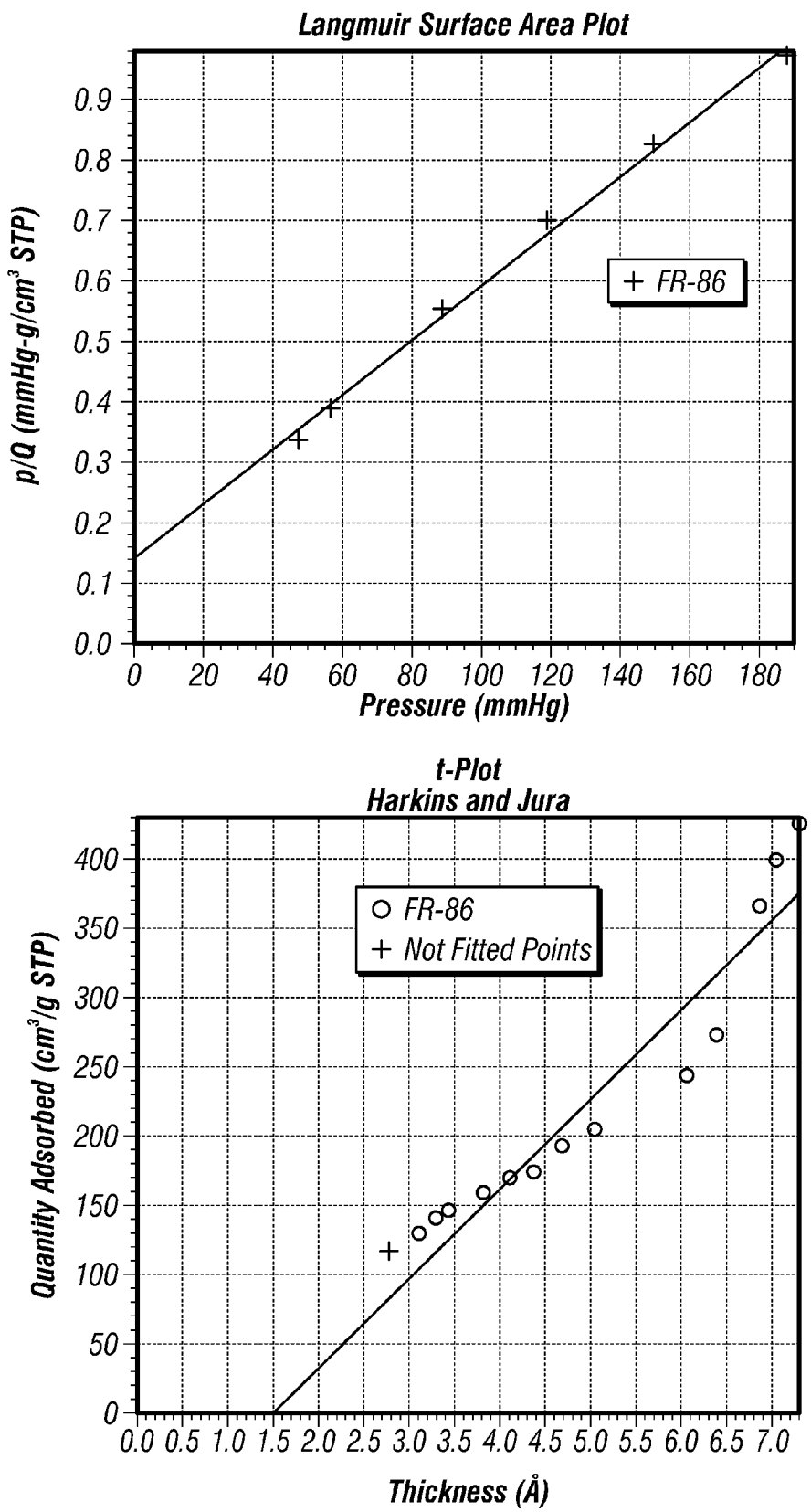
Figure 8:
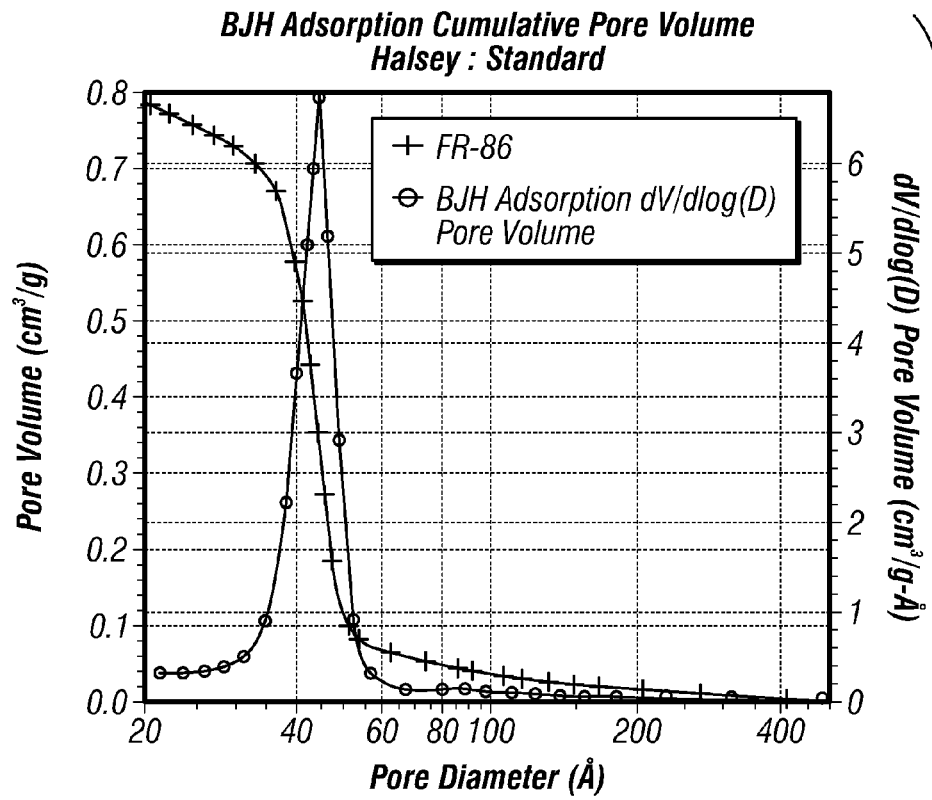
Figure 8:
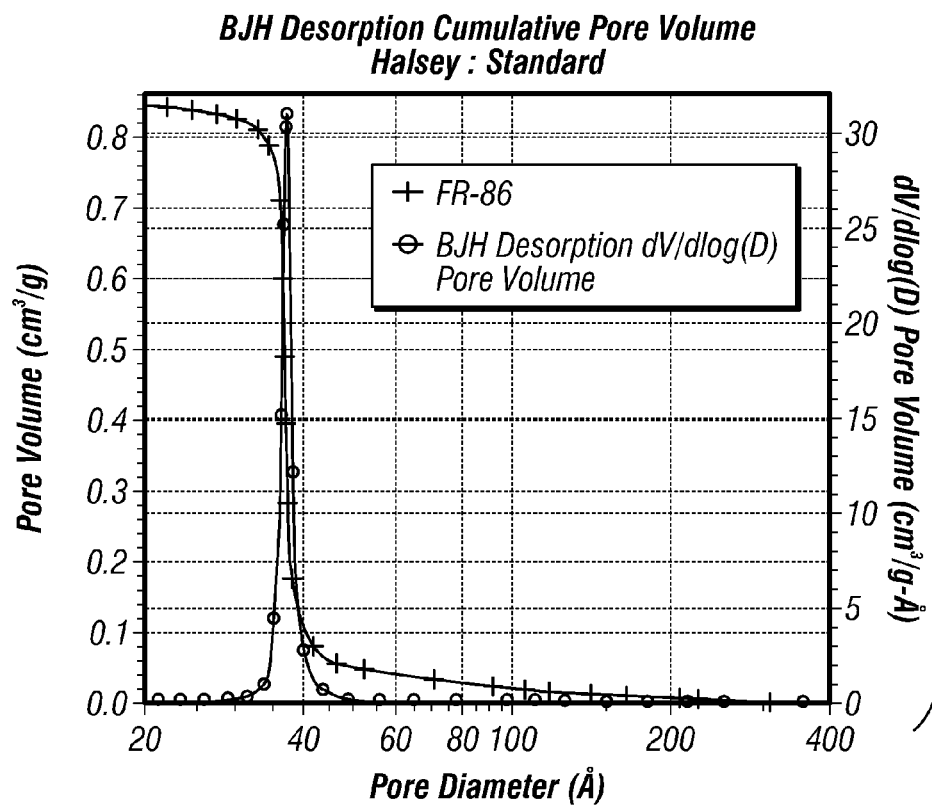

In order to further verify the chemical composition of the sample, thermogravimetric analysis (TGA) (FIG. 6a) of the silica nanospheres was carried out under a nitrogen atmosphere. From room temperature to 1550° C., a negligible weight loss up to about 3.8% was observed. This loss can be attributed to the loss of chemically-adsorbed water and hydroxyl groups, as confirmed by TGA/Fourier transform infrared (FT-IR) analysis of respective fractions (FIG. 7). The material was also characterized by solid state $^{29}$Si CP-MAS NMR spectroscopy. The resulting spectrum showed two characteristic signals at −106 and −112 ppm, which were assigned to $Q^3$ and $Q^4$ sites corresponding to $SiO_4$ substructure of different condensation degrees (FIG. 6b). Absence of signals in the region around −60 indicates formation of no Si—C bond in the material. The nitrogen adsorption-desorption isotherms of the silica nanospheres after the removal of the organic moieties by calcination exhibited the type-IV pattern (FIG. 8). The BET (Brunauer-Emmett-Teller) surface area and the average pore size were found to be 641 $m^2/g^−$ and 4.5 nm, respectively. Thus, the synthesized silica nanoparticles have a high surface area and excellent thermal and sintering stability, which are essential attributes for good catalytic support.

Figures 9A, 9B, 9C, 9D:
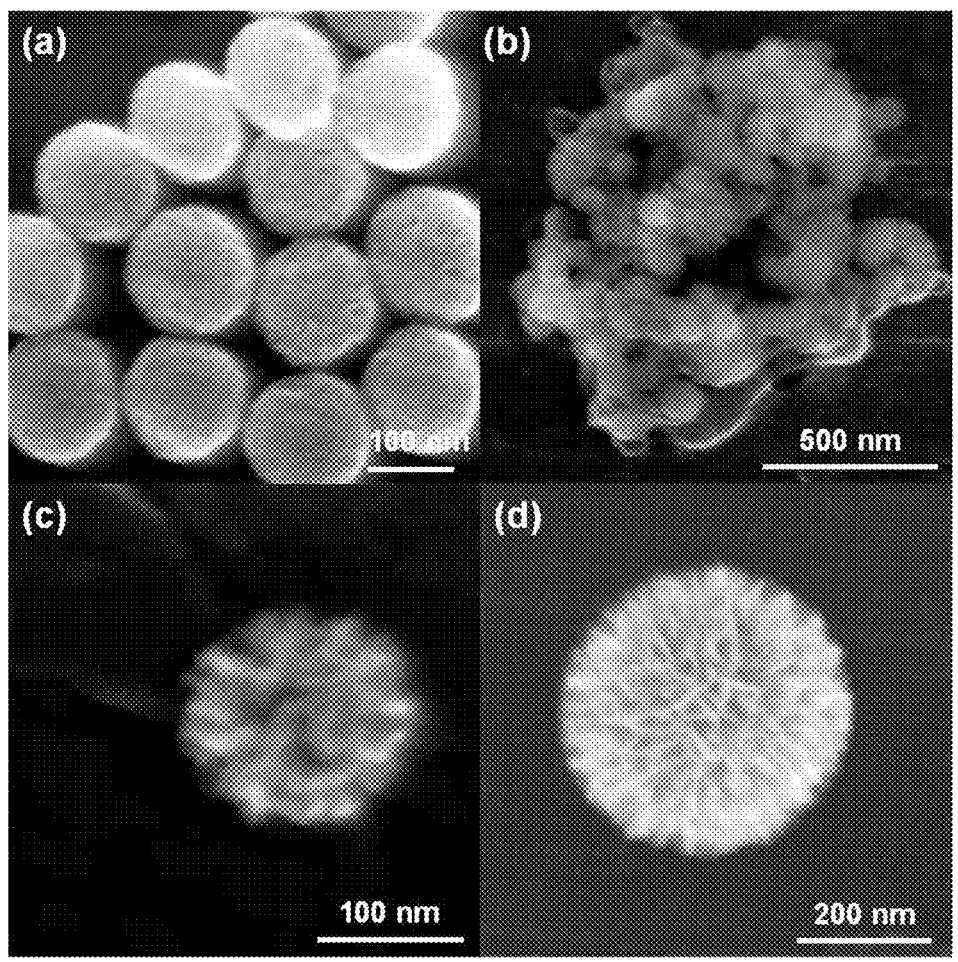
FIGS. 9a-9d. SEM images of Silica nano-spheres with 0.0 (FIG. 9a), 0.003 (FIG. 9b), 0.006 (FIG. 9c), 0.01 (FIG. 9d) mole of urea per 0.012 mole of TEOS.

To study the effect of the urea concentration on the silica morphology, a series of experiments were conducted with varying urea-to-TEOS molar ratios. When no urea was used, only a small amount of silica was isolated, and the silica nanospheres were monodispersed with thin fibers as well as shorter lengths (90-120 nm) (FIG. 9a). These results indicate that the key to the fibrous morphology as well as particle size is control of the speed of hydrolysis by urea, as was apparent when silica synthesis with different amounts of urea was conducted. SEM images show that silica starts growing from none (FIG. 9b) to poorly fibrous (FIG. 9c) to well fibrous (FIG. 9d) nanospheres, when the concentration of the urea was increased from 0.18 gm (0.003 mole) to 0.6 gm (0.01 mole). With a further increase in the amount of urea, no change in the fibrous morphology was observed, except for an increase in the particle size distribution, which may be due to rapid (i.e., uncontrolled) hydrolysis of TEOS molecules by excess urea.

The experiments discussed above reveal a new family of high-surface-area silica nanospheres with unprecedented fibrous morphologies. The material exhibits excellent physical properties including: 1) a high surface; 2) a fibrous surface morphology; 3) good thermal and hydrothermal stabilities; and 4) high mechanical stability. For these reasons, KCC-1 is useful for silica-supported catalysis, wherein it can significantly increase the accessibility of active sites. KCC-1 is also useful for drug delivery, for hydrogen storage, as a chromatography support, and in nano-composite materials.

All of the methods disclosed and claimed herein can be made and executed without undue experimentation in light of the present disclosure. While the methods of this invention have been described in terms of preferred embodiments, it will be apparent to those of skill in the art that variations may be applied to the methods described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Bao et al., *Nature*, 446:172-175, 2007.
Carlsson et al., *J. Electron Microsc.*, 48:795-798, 1999.
Cha et al., *Nature*, 403:289-292, 2000.
Che et al., *Nature Mater.*, 2:801-805, 2003.
Che et al., *Nature*, 429:281-284, 2004.
Corma and Garcia, *Top. Catal.*, 48:8-31, 2008.
Davis et al., *Nature*, 417:813-821, 2002.
Finnefrock et al., *Angew. Chem. Int. Ed.*, 40:1208-1211, 2001.
Gao et al., *Angew. Chem. Int. Ed.*, 45:4295-4298, 2006.
Gellman, *Nature Mater.*, 8:87-88, 2009.
Gole et al., *Colloid Polym. Sci.*, 281:673-685, 2003.
Han et al., *Nature Chem.*, 1:123-127, 2009.
Huo et al., *Nature*, 368:317-321, 1994.
Joo et al., *Nature Mater.*, 8:126-131, 2009.
Kresge et al., *Nature*, 359:710-712, 1992.
Lu et al., *Nature*, 410:913-917, 2001.
Meng et al., *Langmuir*, 25:7879-7883, 2009.
Reetz, In: *Nanoparticles and Catalysis*, Astruc (Ed.), Wiley-VCH, Weinheim, 255-279, 2008.
Sakamoto et al., *Nature*, 408:449-453, 2000.
Schlogl and Hamid, *Angew. Chem. Int. Ed.*, 43:1628-1637, 2004.
Stober et al., *J. Colloid Interface Sci.*, 26:62-69, 1968.
Suzuki et al., *Nature Chem.*, 1:1-5, 2009.
Suzuki et al., *Nature Chem.*, 2:25-29, 2010.
Taney and Pinnavaia, *Science*, 267:865-867, 1995.
Weckhuysen, *Nature Chem.*, 1:690-691, 2009.
Xia et al., *Adv. Mater.*, 12:693-713, 2000.
Yokoi et al., *J. Am. Chem. Soc.*, 128:13664-13665, 2006.
Yu et al., *J. Am. Chem. Soc.*, 124:4556-4557, 2002.
Zhao et al., *Science*, 279:548-552, 1998.

The invention claimed is:

1. A spherical nanoparticle comprising a plurality of silica fibers that are radially oriented in the nanoparticle and that are covalently linked with each other through siloxane linkages, wherein
the nanoparticle has a diameter of between about 1 nm and about 5000 nm.

2. The nanoparticle of claim 1, wherein the nanoparticle is in the form of a dendrimer.

3. The nanoparticle of claim 1, wherein each fiber has a length of between about 1 nm and about 2500 nm.

4. The nanoparticle of claim 1, wherein each fiber has a thickness of between about 1 nm and about 25 nm.

5. The nanoparticle of claim 4, wherein each fiber has a thickness of between about 1 nm to about 10 nm.

6. The nanoparticle of claim 5, wherein each fiber has a length of between about 1 nm and about 2500 nm and a thickness of between about 1 nm and about 10 nm.

7. The nanoparticle of claim 1, wherein the fibers are of varying thickness and varying lengths.

8. The nanoparticle of claim 1, wherein the fibers are of a uniform thickness and a uniform length.

9. The nanoparticle of claim 1, wherein the nanoparticle is comprised of about $10^3$ fibers to $10^6$ fibers.

10. The nanoparticle of claim 9, wherein the nanoparticle is comprised of at least about $10^4$ fibers.

11. The nanoparticle of claim 10, wherein the nanoparticle is comprised of at least about $10^5$ fibers.

12. The nanoparticle of claim 1, wherein the nanoparticle is further defined as a nanosphere comprised of a plurality of fibers that are substantially radially oriented within the nanosphere.

13. The nanoparticle of claim 1, further comprising one or more ligands attached to one or more fibers.

14. The nanoparticle of claim 13, wherein a ligand is attached to the one or more fibers via a linker.

15. The nanoparticle of claim 14, wherein the linker is an alkyl, a hydride, a carbene, a carbyne, a cyclopentadienyl, an alkoxide, an amido, or an imido group.

16. The nanoparticle of claim 13, wherein the ligand is a catalyst, a drug, or an organic molecule.

17. The nanoparticle of claim 16, wherein the ligand is a catalyst.

18. The nanoparticle of claim 17, wherein the catalyst is a metal catalytic molecule.

19. The nanoparticle of claim 18, wherein the metal catalytic molecule is a metal or a metal oxide.

20. The nanoparticle of claim 19, wherein the metal catalytic molecule is a metal selected from the group consisting of Au, Pt, Pd, Ag, Ni, Ru, Rh, Ir, Os, Co, Fe and Cu.

21. The nanoparticle of claim 19, wherein the metal catalytic molecule is a metal oxide selected from the group consisting of $Al_2O_3$, $TiO_2$, $Fe_2O_3$, $CeO_2$, $CuO$, $ZnO$, $SiO_2$, $V2O_5$, $MgO$, $La2O_3$, $ZrO_2$, $SnO_2$, $MnO_2$, $MoO_3$, $Mo_2O_5$ and zeolites.

22. The nanoparticle of claim 1, wherein the nanoparticle has a maximum diameter of between about 100 nm and about 750 nm.

23. The nanoparticle of claim 22, wherein the nanoparticle has a maximum diameter of between about 250 nm and about 500 nm.

24. The nanoparticle of claim 1, wherein each fiber has a length of between about 1 nm and about 500 nm.

25. A composition comprising nanoparticles as set forth in claim 1.

26. A composite comprising nanoparticles as set forth in claim 1.

27. A catalyst composition comprising a nanoparticle as set forth in claim 17.

28. A kit comprising nanoparticles as set forth in claim 1 in one or more sealed containers.

29. The kit of claim 28, wherein the nanoparticles are comprised in a chromatography column.

30. A chromatography column comprising a stationary phase comprising nanoparticles as set forth in claim 1.

31. A drug delivery device comprising nanoparticles as set forth in claim 1.

32. A packaging material comprising nanoparticles as set forth in claim 1.

33. The nanoparticle of claim 1, wherein each fiber is in contact with at least one other fiber.

34. The nanoparticle of claim 1, wherein each fiber has a length of between about 1 nm and about 5000 nm.

35. The nanoparticle of claim 1, wherein each fiber has a thickness of between about 1 nm to about 50 nm.

* * * * *

UNITED STATES PATENT AND TRADEMARK OFFICE
CERTIFICATE OF CORRECTION

PATENT NO. : 8,883,308 B2  Page 1 of 1
APPLICATION NO. : 13/038789
DATED : November 11, 2014
INVENTOR(S) : Vivek Polshettiwar et al.

It is certified that error appears in the above-identified patent and that said Letters Patent is hereby corrected as shown below:

In the Claims (Claim 21, line 3), on column 16, line 26, delete "V2O$_5$" and insert --V$_2$O$_5$-- therefor.

(Claim 21, line 4), on column 16, line 27, delete "La2O$_3$" and insert --La$_2$O$_3$-- therefor.

Signed and Sealed this
Twenty-fourth Day of March, 2015

Michelle K. Lee
*Director of the United States Patent and Trademark Office*